United States Patent
Takizawa

(10) Patent No.: US 10,495,724 B2
(45) Date of Patent: Dec. 3, 2019

(54) POSITION DETECTION SYSTEM AND POSITION DETECTION METHOD

(71) Applicant: Murata Manufacturing Co., Ltd., Kyoto (JP)

(72) Inventor: Koichi Takizawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/186,661

(22) Filed: Nov. 12, 2018

(65) Prior Publication Data

US 2019/0079160 A1    Mar. 14, 2019

Related U.S. Application Data

(63) Continuation of application No. PCT/JP2017/018731, filed on May 18, 2017.

(30) Foreign Application Priority Data

May 25, 2016    (JP) .................. 2016-104267

(51) Int. Cl.
*G01S 5/06* (2006.01)
*G01S 5/02* (2010.01)
*H04L 7/00* (2006.01)

(52) U.S. Cl.
CPC ................ *G01S 5/06* (2013.01); *G01S 5/021* (2013.01); *G01S 5/0221* (2013.01); *H04L 7/00* (2013.01)

(58) Field of Classification Search
CPC ...... G01S 5/0036; G01S 5/021; G01S 5/0221; G01S 5/06; G01S 5/14; H04L 7/00
(Continued)

(56) References Cited

U.S. PATENT DOCUMENTS

| | | |
|---|---|---|
| 2005/0130669 A1 | 6/2005 | Mizugaki et al. |
| 2005/0280578 A1 | 12/2005 | Boyd |
| 2014/0266609 A1 | 9/2014 | Yang |

FOREIGN PATENT DOCUMENTS

| | | |
|---|---|---|
| JP | 2005-140617 A | 6/2005 |
| JP | 2007-510909 A | 4/2007 |

(Continued)

OTHER PUBLICATIONS

International Search Report for International Application No. PCT/JP2017/018731 dated Aug. 15, 2017.
(Continued)

*Primary Examiner* — Dao L Phan
(74) *Attorney, Agent, or Firm* — Pearne & Gordon LLP

(57) ABSTRACT

A position detection system includes a mobile station, a reference station, fixed stations to, and a server. The mobile station transmits a first radio signal S1 and the reference station transmits a second radio signal S2 multiple times. Each of the fixed stations extracts a first phase difference based on the first radio signal S1 and extracts second phase differences based on the second radio signals S2. The server calculates time variations of the second phase differences based on the multiple second phase differences to calculate a third phase difference. The server cancels phase offset by the respective fixed stations using phase difference information between the mobile station and the respective fixed stations and phase difference information between the reference station and the respective fixed stations and acquires distance information between the respective fixed stations and the mobile station to calculate the position of the mobile station.

8 Claims, 11 Drawing Sheets

(58) Field of Classification Search
USPC .......................................................... 342/458
See application file for complete search history.

(56) References Cited

FOREIGN PATENT DOCUMENTS

| | | |
|---|---|---|
| JP | 2009-133649 A | 6/2009 |
| JP | 2011-117879 A | 6/2011 |

OTHER PUBLICATIONS

Written Opinion for International Application No. PCT/JP2017/018731 dated Aug. 15, 2017.

$(n=1,2,3\cdots)$

POSITION DETECTION SYSTEM AND POSITION DETECTION METHOD

This is a continuation of International Application No. PCT/JP2017/018731 filed on May 18, 2017 which claims priority from Japanese Patent Application No. 2016-104267 filed on May 25, 2016. The contents of these applications are incorporated herein by reference in their entireties.

BACKGROUND OF THE DISCLOSURE

Field of the Disclosure

The present disclosure relates to a position detection system and a position detection method that detect the position of a mobile station.

Description of the Related Art

Position detection systems are generally known, which includes multiple fixed stations (base stations) and a mobile station, the multiple fixed stations each of which receives pulse signals transmitted from the mobile station, and calculates the positional relationship between the fixed stations and the mobile station from the difference between the reception times when the fixed stations have received the pulse signals.

In addition, position identification apparatuses each composed of a reference station, a relay station, and a mobile terminal are known (for example, refer to Patent Document 1).

Patent Document 1: Japanese Unexamined Patent Application Publication No. 2011-117879

BRIEF SUMMARY OF THE DISCLOSURE

Since the position detection systems using pulse signals measure the reception times of the pulse signals, it is necessary to decrease the pulse width in order to increase measurement resolution and to synchronize the reception times of the respective fixed stations with high accuracy. However, there are problems in that decreasing the pulse width increases occupied bandwidth and it is necessary to perform complicated processing in order to synchronize the respective fixed stations with high accuracy.

The position identification apparatus described in Patent Document 1 has a configuration in which the phases of distance measurement signals and the phases of direction measurement signals, which are transmitted from the reference station and the relay station, are detected to identify the position of the mobile terminal, which moves along a long side of a rectangular service area. However, since it is necessary to control the directivity of antennas of the reference station and the relay station in order to measure the direction, there is a problem in that the processing is made complicated. In addition, since the range in which the position of the mobile terminal is capable of being identified is limited to a rectangular shape, there is a problem in that the location and the condition in which the position identification apparatus is used are limited.

In view of the above problems of the related art, it is an object of the present disclosure to provide a position detection system and a position detection method capable of asynchronously simplifying the system.

(1). In order to resolve the above problems, the present disclosure provides a position detection system including a mobile station including a mobile station reference clock circuit, a radio signal transmission circuit, and a transmission antenna; a reference station including a reference station reference clock circuit, a radio signal reception circuit, a reception antenna, a radio signal transmission circuit, and a transmission antenna; and at least three fixed stations each including a fixed station reference clock circuit, a radio signal reception circuit, and a reception antenna. The fixed station reference clock circuits in the three or more fixed stations asynchronously and independently operate. The mobile station intermittently transmits a first radio signal and a trigger radio signal based on a reference clock of the mobile station reference clock circuit. The reference station is disposed at a predetermined position and, upon reception of the trigger radio signal transmitted from the mobile station, transmits a second radio signal based on a reference clock of the reference station reference clock circuit multiple times. Each fixed station receives the first radio signal and extracts a first phase difference between a carrier included in the first radio signal and a reference clock of each fixed station. The multiple second radio signals are received and multiple second phase differences between carriers included in the second radio signals and the reference clock of each fixed station are extracted. Time variation of the second phase differences is calculated based on the extracted multiple second phase differences and a third phase difference between the carrier included in the second radio signal and the reference clock of each fixed station at timing when the first radio signal is received is calculated based on the time variation. Phase offset of the reference clock of each fixed station is cancelled using phase difference information between the mobile station and each fixed station and phase difference information between the reference station and each fixed station and distance information between each fixed station and the mobile station is acquired to calculate a position of the mobile station.

According to the present disclosure, the position detection system is configured so as to calculate the position of the mobile station using the phase difference information between the mobile station and the respective fixed stations and the phase difference information between the reference station and the respective fixed stations. In this case, since a shift in phase of the radio signals reaching the respective fixed stations is used, distance resolution shorter than the wavelength of the radio signal is capable of being realized. Accordingly, since the narrowband radio signals are capable of being used even when the position of the mobile station is detected with the distance resolution being improved, the occupied bandwidth of the radio signals is capable of being narrowed, compared with the case in which the pulse signals are used.

In addition, the position detection system cancels the phase offsets of the reference clocks by the mobile station, the reference station, and the respective fixed stations using the phase difference information between the mobile station and the respective fixed stations and the phase difference information between the reference station and the respective fixed stations. Accordingly, since it is not necessary to achieve synchronization between the respective fixed stations, the mobile station, and the reference station, the system building is capable of being simplified.

Specifically, the position detection system is configured so as to calculate the time variations of the second phase differences based on the multiple second phase differences between the reference station and the respective fixed stations and to calculate the third phase differences between the carrier included in the second radio signal and the respective reference clocks of the respective fixed stations at the timing when the first radio signal is received. Accordingly, it is possible to cancel the phase offsets by the mobile station, the reference station, and the respective fixed stations using the first phase differences between the mobile station and the respective fixed stations and the third phase differences between the reference station and the respective fixed stations at the timing when the first radio signal is received. As a result, since the timing when the first phase differences are extracted is capable of being synchronized with the timing when the third phase differences are calculated, the accuracy of phase correction is improved to realize the position detection with high accuracy.

In addition, calculating the third phase differences at the timing when the first radio signal is received enables the phase offsets by the mobile station, the reference station, and the respective fixed stations to be cancelled even when the frequencies of the reference clocks of the respective fixed stations are different from each other.

Furthermore, the mobile station is configured so as to transmit the trigger radio signal, and the reference station is configured so as to transmit the multiple second radio signals upon reception of the trigger radio signal transmitted from the mobile station. Accordingly, the intervals between the times when the respective fixed stations receive the first radio signal from the mobile station and the times when the respective fixed stations receive the second radio signal from the reference station are capable of being shortened. As a result, since the phase rotation caused by the frequency deviation between the respective fixed stations is capable of being suppressed, the accuracy of the phase correction is improved to realize the position detection with high accuracy.

(2). In the position detection system of the present disclosure, the fixed station reference clock circuits in the fixed stations are configured so as to generate the reference clocks of the same frequency.

With the above configuration, since the frequency deviation between the respective fixed stations is capable of being reduced, compared with the case in which the respective fixed stations generate the reference clocks of different frequencies, the accuracy of the phase correction is improved to realize the position detection with high accuracy. In addition, since the respective fixed station reference clock circuits are capable of being configured using the same circuit components, it is possible to reduce the cost.

(3). In the position detection system of the present disclosure, at least one fixed station, among the three or more fixed stations, is configured so as to also function as the reference station and transmit the multiple second radio signals.

With the above configuration, since the phase offsets by the respective fixed stations are capable of being cancelled using the multiple second radio signals transmitted from the fixed station, it is not necessary to separately provide the reference station. As a result, since the system is capable of simply being built, it is possible to reduce the cost.

(4). The position detection system of the present disclosure is configured in which the mobile station reference clock circuit in the mobile station has a function to generate the reference clocks of two or more frequencies, the mobile station transmits the first radio signals of carrier frequencies of two or more kinds, the reference station reference clock circuit in the reference station has a function to generate the reference clocks of two or more frequencies, and the reference station transmits the multiple second radio signals of carrier frequencies of two or more kinds.

With the above configuration, the phase difference detected using the carrier frequencies of one kind is different from the phase difference detected using the carrier frequencies of the other kind in their repetition cycles. Accordingly, the number of cycles of the two phase differences is capable of being calculated using the difference between the two phase differences. Consequently, the cycle of the phase difference is lengthened and the uncertainty of the phase cycle is removed to calculate the absolute phase, thus calculating the position of the mobile station with high accuracy.

(5). The present disclosure provides a position detection method using a position detection system including a mobile station including a mobile station reference clock circuit, a radio signal transmission circuit, and a transmission antenna; a reference station including a reference station reference clock circuit, a radio signal reception circuit, a reception antenna, a radio signal transmission circuit, and a transmission antenna; and at least three fixed stations each including a fixed station reference clock circuit, a radio signal reception circuit, and a reception antenna. The fixed station reference clock circuits in the three or more fixed stations asynchronously and independently operate. The mobile station intermittently transmits a first radio signal and a trigger radio signal based on a reference clock of the mobile station reference clock circuit. The reference station is disposed at a predetermined position and, upon reception of the trigger radio signal transmitted from the mobile station, transmits a second radio signal based on a reference clock of the reference station reference clock circuit multiple times. Each fixed station receives the first radio signal and extracts a first phase difference between a carrier included in the first radio signal and a reference clock of each fixed station. The multiple second radio signals are received and multiple second phase differences between carriers included in the second radio signals and the reference clock of each fixed station are extracted. Time variation of the second phase differences is calculated based on the extracted multiple second phase differences and a third phase difference between the carrier included in the second radio signal and the reference clock of each fixed station at timing when the first radio signal is received is calculated based on the time variation. Phase offset of the reference clock of each fixed station is cancelled using phase difference information between the mobile station and each fixed station and phase difference information between the reference station and each fixed station and distance information between each fixed station and the mobile station is acquired to calculate a position of the mobile station.

According to the present disclosure, the position detection system is configured so as to calculate the position of the mobile station using the phase difference information between the mobile station and the respective fixed stations and the phase difference information between the reference station and the respective. In this case, since a shift in phase of the radio signals reaching the respective fixed stations is used, distance resolution shorter than the wavelength of the radio signal is capable of being realized. Accordingly, since the narrowband radio signals are capable of being used even when the position of the mobile station is detected with the distance resolution being improved, the occupied bandwidth of the radio signals is capable of being narrowed, compared with the case in which the pulse signals are used.

In addition, the position detection system cancels the phase offsets of the reference clocks by the mobile station, the reference station, and the respective fixed stations using the phase difference information between the mobile station and the respective fixed stations and the phase difference information between the reference station and the respective fixed stations. Accordingly, since it is not necessary to achieve synchronization between the respective fixed stations, the mobile station, and the reference station, the system building is capable of being simplified.

(6). In the position detection method of the present disclosure, the fixed station reference clock circuits in the fixed stations are configured so as to generate the reference clocks of the same frequency.

With the above configuration, since the frequency deviation between the respective fixed stations is capable of being reduced, compared with the case in which the respective fixed stations generate the reference clocks of different frequencies, the accuracy of the phase correction is improved to realize the position detection with high accuracy. In addition, since the respective fixed station reference clock circuits are capable of being configured using the same circuit components, it is possible to reduce the cost.

(7). In the position detection method of the present disclosure, at least one fixed station, among the three or more fixed stations, is configured so as to also function as the reference station and transmit the multiple second radio signals.

With the above configuration, since the phase offsets by the respective fixed stations are capable of being cancelled using the multiple second radio signal transmitted from the fixed station, it is not necessary to separately provide the reference station. As a result, since the system is capable of simply being built, it is possible to reduce the cost.

(8). In the position detection method of the present disclosure, the mobile station reference clock circuit in the mobile station is configured so as to have a function to generate the reference clocks of two or more frequencies, the mobile station is configured so as to transmit the first radio signals of carrier frequencies of two or more kinds, the reference station reference clock circuit in the reference station is configured so as to have a function to generate the reference clocks of two or more frequencies, and the reference station is configured so as to transmit the multiple second radio signals of carrier frequencies of two or more kinds.

With the above configuration, the phase difference detected using the carrier frequencies of one kind is different from the phase difference detected using the carrier frequencies of the other kind in their repetition cycles. Accordingly, the number of cycles of the two phase differences is capable of being calculated using the difference between the two phase differences. Consequently, the cycle of the phase difference is lengthened and the uncertainty of the phase cycle is removed to calculate the absolute phase, thus calculating the position of the mobile station with high accuracy.

DETAILED DESCRIPTION OF THE DISCLOSURE

Figure 1:
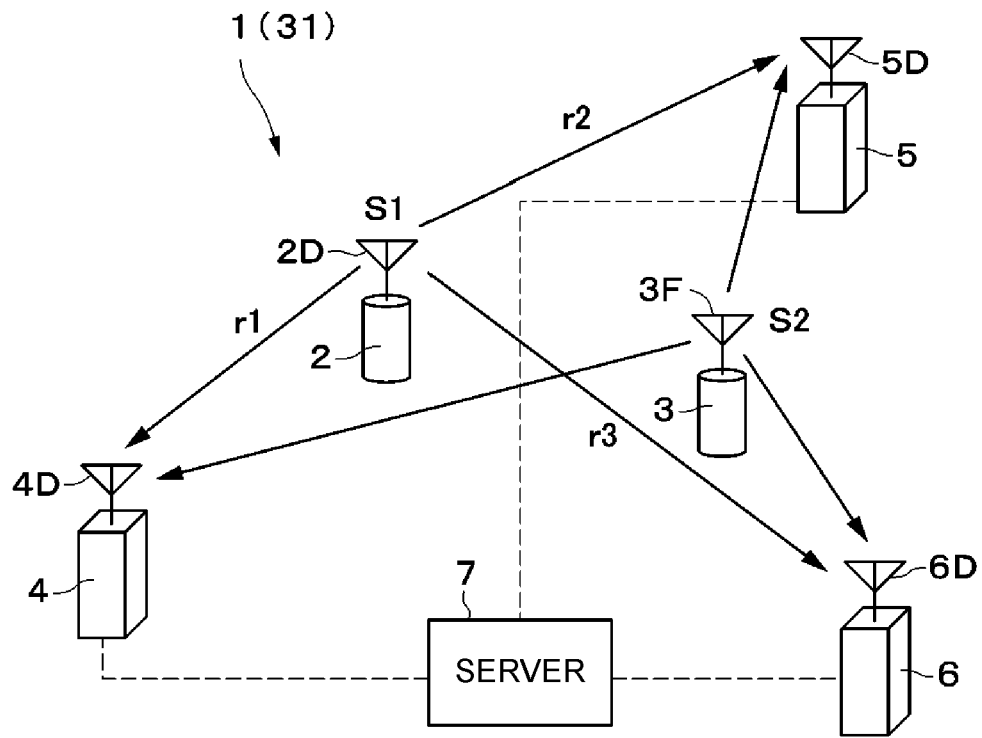
FIG. 1 is a block diagram illustrating the entire configuration of a position detection system according to first and third embodiments.

Position detection systems according to embodiments of the present disclosure will herein be described in detail with reference to the drawings.

A position detection system 1 according to a first embodiment is described with reference to FIG. 1 to FIG. 10. The position detection system 1 includes a mobile station 2, a reference station 3, a first fixed station 4, a second fixed station 5, a third fixed station 6, a server 7, and so on. In this case, for example, it is assumed that the mobile station 2 is apart from the first fixed station 4 by a distance r1, the mobile station 2 is apart from the second fixed station 5 by a distance r2, and the mobile station 2 is apart from the third fixed station 6 by a distance r3.

Figure 2:
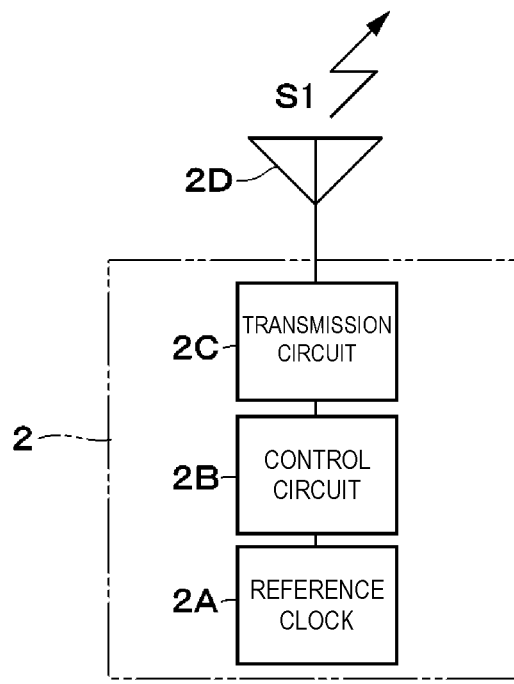
FIG. 2 is a block diagram illustrating the entire configuration of a mobile station in FIG. 1.

The mobile station 2 is, for example, a movable radio terminal that can be a detection target. As illustrated in FIG. 2, the mobile station 2 includes a mobile station reference clock circuit 2A, a control circuit 2B, a radio signal transmission circuit 2C, a transmission antenna 2D, and so on. This mobile station 2 transmits a first radio signal S1 to each of the fixed stations 4 to 6 and transmits a trigger radio signal St to the reference station 3.

The mobile station reference clock circuit 2A includes, for example, an oscillator. This mobile station reference clock circuit 2A generates a reference clock (CLK) Cm of an angular frequency ωm (carrier frequency), on which the first radio signal S1 and the trigger radio signal St are based, for the transmission antenna 2D. The control circuit 2B is composed of, for example, a microcomputer. The control circuit 2B controls, for example, the timing when the mobile station 2 intermittently transmits the first radio signal S1 and the trigger radio signal St.

The radio signal transmission circuit 2C includes, for example, a modulation circuit and an amplifier. The radio signal transmission circuit 2C is connected to the control circuit 2B at the input side and is connected to the transmission antenna 2D at the output side. This radio signal transmission circuit 2C generates the first radio signal S1 and the trigger radio signal St based on the reference clock Cm. The transmission antenna 2D is composed of various antennas that are capable of radiating the first radio signal S1 and the trigger radio signal St. The transmission antenna 2D transmits the first radio signal S1 to each of the fixed stations 4 to 6 and transmits the trigger radio signal St to the reference station 3. The trigger radio signal St may be the same as the first radio signal S1 or may be a radio signal different from the first radio signal S1 for example, through a variety of signal modulation.

Here, carrier phase Pm included in the first radio signal S1, which the mobile station 2 transmits, is represented by Formula 1 described below where the angular frequency is denoted by ωm, time is denoted by t, and phase offset is denoted by φm. In this case, the phase offset means a shift in phase caused by the mobile station 2, the reference station 3, and the respective fixed stations 4 to 6 that asynchronously and independently operate.

$$Pm = \omega m \cdot t + \phi m \quad \text{[Formula 1]}$$

Figure 5:
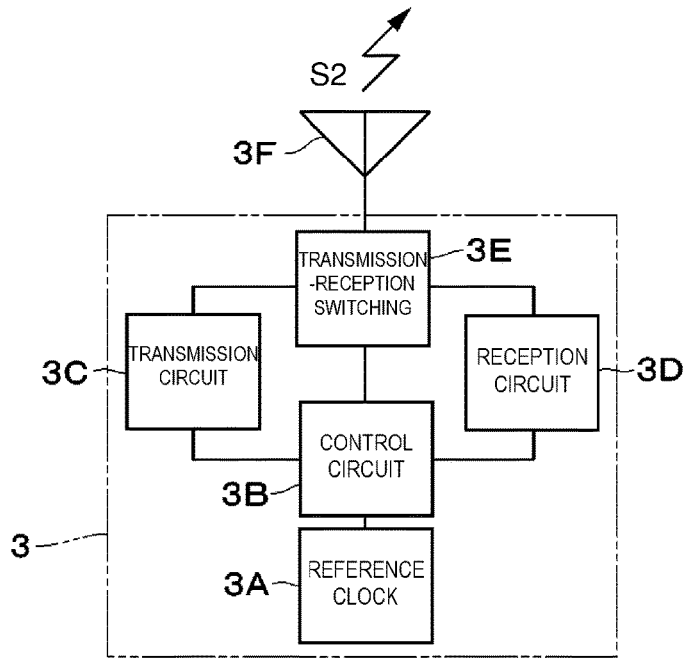
FIG. 5 is a block diagram illustrating the entire configuration of a reference station in FIG. 1.

The reference station 3 is disposed at a predetermined position. As illustrated in FIG. 5, the reference station 3 includes a reference station reference clock circuit 3A, a control circuit 3B, a radio signal transmission circuit 3C, a radio signal reception circuit 3D, a transmission-reception switching circuit 3E, a transmission-reception antenna 3F, and so on. Upon reception of the trigger radio signal St transmitted from the mobile station 2, this reference station 3 transmits a second radio signal S2 to each of the fixed stations 4 to 6 multiple times.

The reference station reference clock circuit 3A includes, for example, an oscillator. This reference station reference clock circuit 3A generates a reference clock Cs of an angular frequency ωs (carrier frequency), on which the second radio signal S2 is based, for the transmission-reception antenna 3F. The control circuit 3B is composed of, for example, a microcomputer. The control circuit 3B controls, for example, an operation in which the reference station 3 receives the trigger radio signal St and intermittently transmits the second radio signal S2.

The radio signal transmission circuit 3C is connected to the control circuit 3B and the transmission-reception switching circuit 3E. This radio signal transmission circuit 3C includes, for example, a modulation circuit and an amplifier. This radio signal transmission circuit 3C generates the second radio signal S2 based on the reference clock Cs. In contrast, the radio signal reception circuit 3D is connected to the control circuit 3B and the transmission-reception switching circuit 3E. The radio signal reception circuit 3D includes, for example, an amplifier and a filter. This radio signal reception circuit 3D amplifies the trigger radio signal St received with the transmission-reception antenna 3F and removes noise from the trigger radio signal St to supply the trigger radio signal St to the control circuit 3B.

The radio signal transmission circuit 3C and the radio signal reception circuit 3D are connected to the transmission-reception antenna 3F with the transmission-reception switching circuit 3E disposed therebetween. This transmission-reception switching circuit 3E switches between transmission and reception in response to an instruction from the control circuit 3B, supplies the second radio signal S2 from the radio signal transmission circuit 3C to the transmission-reception antenna 3F, and supplies the trigger radio signal St received with the transmission-reception antenna 3F to the radio signal reception circuit 3D. The transmission-reception antenna 3F is composed of various antennas that is capable of receiving the trigger radio signal St and capable of radiating the second radio signal S2. The transmission-reception antenna 3F transmits the second radio signal S2 to each of the fixed stations 4 to 6 multiple times.

Carrier phase Ps included in the second radio signal S2 transmitted from the reference station 3 is represented by Formula 2 described below where the angular frequency is denoted by ωs, the time is denoted by t, and phase offset is denoted by φs.

$$Ps = \omega s \cdot t + \phi s \quad \text{[Formula 2]}$$

Figure 3:
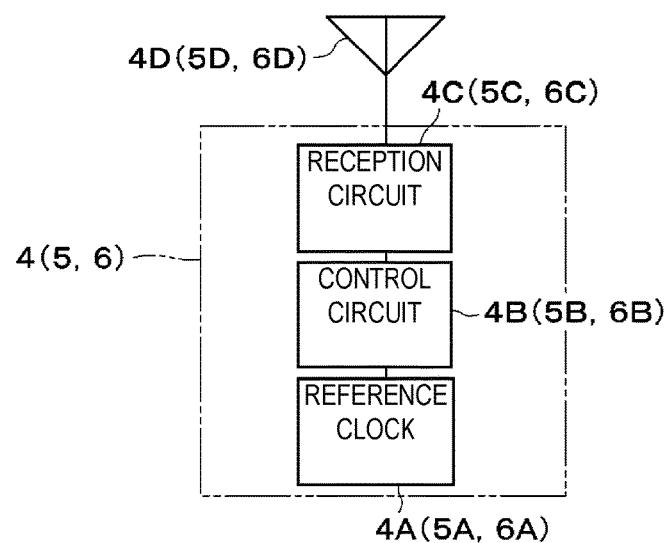
FIG. 3 is a block diagram illustrating the entire configuration of each fixed station in FIG. 1.
Figure 4:
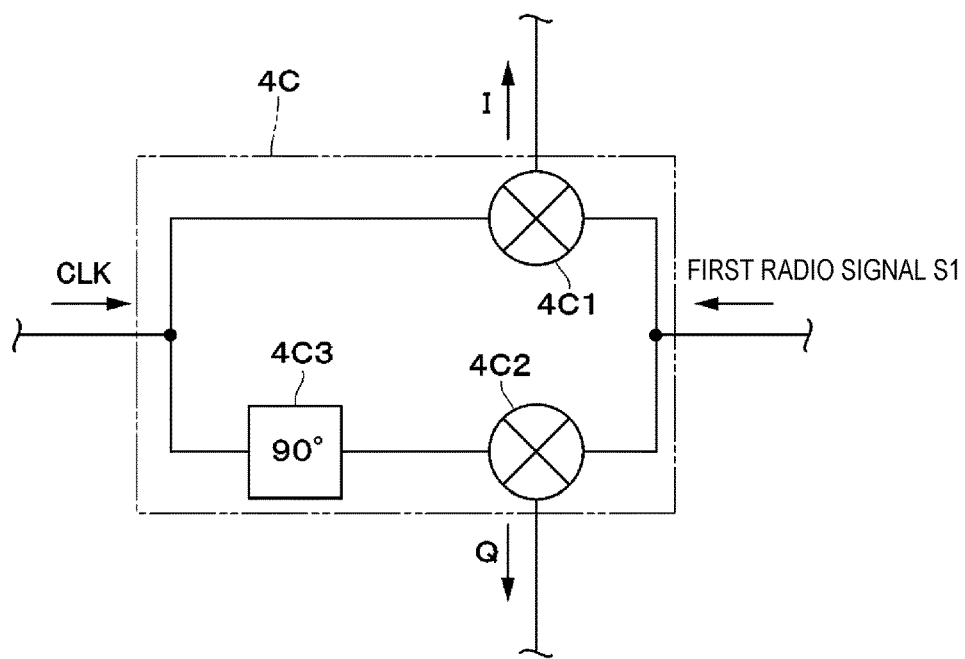
FIG. 4 is a circuit diagram illustrating the configuration of a reception circuit in the fixed station.

The first fixed station 4 is disposed at a predetermined position. As illustrated in FIG. 3, the first fixed station 4 includes a fixed station reference clock circuit 4A, a control circuit 4B, a radio signal reception circuit 4C, a reception antenna 4D, and so on. This first fixed station 4 receives the first radio signal S1 transmitted from the mobile station 2 and the multiple second radio signals S2 transmitted from the reference station 3.

The fixed station reference clock circuit 4A includes, for example, an oscillator. This fixed station reference clock circuit 4A generates a reference clock Cf1 of an angular frequency ωf1 at which the first fixed station 4 operates. The control circuit 4B is composed of, for example, a microcomputer. The control circuit 4B controls an operation to detect a phase difference Δφmf1 between the reference clock Cf1 and the first radio signal S1 and phase differences Δφsbf1 and Δφscf1 between the reference clock Cf1 and the multiple second radio signals S2.

Here, phase Pf1 of the reference clock Cf1 of the first fixed station 4 is represented by Formula 3 described below where the angular frequency is denoted by ωf1, the time is denoted by t, and phase offset is denoted by φf1.

$$Pf1 = \omega f1 \cdot t + \phi f1 \quad \text{[Formula 3]}$$

The radio signal reception circuit 4C is connected to the reception antenna 4D and the control circuit 4B. This radio signal reception circuit 4C includes, for example, mixers 4C1 and 4C2, a phase shifter 4C3, and a phase detection circuit (not illustrated). This radio signal reception circuit 4C extracts the phase difference Δφmf1 between the carrier phase Pm included in the first radio signal S1 received with the reception antenna 4D and the phase Pf1 of the reference clock Cf1, and the phase differences Δφsbf1 and Δφscf1 between the carrier phases Ps included in the multiple second radio signals S2 received with the reception antenna 4D and the phase Pf1 of the reference clock Cf1.

Specifically, the radio signal reception circuit 4C mixes (down-conversion) the reference clock Cf1 with the first radio signal S1 (the second radio signal S2), which is the reception signal, in the mixer 4C1 to generate an I signal. In addition, the radio signal reception circuit 4C advances (delays) the phase of the reference clock Cf1 outputted from the fixed station reference clock circuit 4A by 90° in the phase shifter 4C3 and mixes (down-conversion) the reference clock Cf1 advanced by 90° with the first radio signal S1 (the second radio signal S2), which is the reception signal, in the mixer 4C2 to generate a Q signal. The I signal and the Q signal are supplied to the phase detection circuit. The phase detection circuit calculates the phase difference $\Delta\phi mf1$ between the carrier phase Pm of the first radio signal S1 and the phase Pf1 of the reference clock Cf1. In addition, the phase detection circuit calculates the phase differences $\Delta\phi sbf1$ and $\Delta\phi scf1$ between the carrier phases Ps of the multiple second radio signals S2 and the phase Pf1 of the reference clock Cf1.

The second fixed station 5 is disposed at a predetermined position different from that of the first fixed station 4. This second fixed station 5 includes a fixed station reference clock circuit 5A, a control circuit 5B, a radio signal reception circuit 5C, a reception antenna 5D, and so on, as in the first fixed station 4.

The fixed station reference clock circuit 5A includes, for example, an oscillator. This fixed station reference clock circuit 5A generates a reference clock Cf2 of an angular frequency $\omega f2$ at which the second fixed station 5 operates. The control circuit 5B is composed of, for example, a microcomputer. The control circuit 5B controls an operation to detect a phase difference $\Delta\phi mf2$ between the reference clock Cf2 and the first radio signal S1 and phase differences $\Delta\phi sbf2$ and $\Delta\phi scf2$ between the reference clock Cf2 and the multiple second radio signals S2. In this case, the second fixed station 5 and the first fixed station 4 asynchronously and independently operate. The angular frequency $\omega f2$ and the angular frequency $\omega f1$ may be equal to each other ($\omega f2=\omega f1$) or may be different from each other ($\omega f2\neq\omega f1$).

Here, phase Pf2 of the reference clock Cf2 of the second fixed station 5 is represented by Formula 4 described below where the angular frequency is denoted by $\omega f2$, the time is denoted by t, and phase offset is denoted by $\phi f2$.

$$Pf2=\omega f2\cdot t+\phi f2 \qquad \text{[Formula 4]}$$

The radio signal reception circuit 5C is connected between the reception antenna 5D and the control circuit 5B. The radio signal reception circuit 5C is configured in the same manner as in the radio signal reception circuit 4C in the first fixed station 4. This radio signal reception circuit 5C calculates the phase difference $\Delta\phi mf2$ between the carrier phase Pm of the first radio signal S1 received with the reception antenna 5D and the phase Pf2 of the reference clock Cf2. In addition, the radio signal reception circuit 5C calculates the phase differences $\Delta\phi sbf2$ and $\Delta\phi scf2$ between the carrier phases Ps of the multiple second radio signals S2 received with the reception antenna 5D and the phase Pf2 of the reference clock Cf2.

The third fixed station 6 is disposed at a predetermined position different from those of the first and second fixed stations 4 and 5. This third fixed station 6 includes a fixed station reference clock circuit 6A, a control circuit 6B, a radio signal reception circuit 6C, a reception antenna 6D, and so on, as in the first fixed station 4.

The fixed station reference clock circuit 6A includes, for example, an oscillator. This fixed station reference clock circuit 6A generates a reference clock Cf3 of an angular frequency $\omega f3$ at which the third fixed station 6 operates. The control circuit 6B is composed of, for example, a microcomputer. The control circuit 6B controls an operation to detect a phase difference $\Delta\phi mf3$ between the reference clock Cf3 and the first radio signal S1 and phase differences $\Delta\phi sbf3$ and $\Delta\phi scf3$ between the reference clock Cf3 and the multiple second radio signals S2. In this case, the third fixed station 6 and the first and second fixed stations 4 and 5 asynchronously and independently operate. The angular frequency $\omega f3$ and the angular frequencies $\omega f1$ and $\omega f2$ may be equal to each other ($\omega f3=\omega f1=\omega f2$) or may be different from each other ($\omega f3\neq\omega f1\neq\omega f2$).

Here, phase Pf3 of the reference clock Cf3 of the third fixed station 6 is represented by Formula 5 described below where the angular frequency is denoted by $\omega f3$, the time is denoted by t, and phase offset is denoted by $\phi f3$.

$$Pf3=\omega f3\cdot t+\phi f3 \qquad \text{[Formula 5]}$$

The radio signal reception circuit 6C is connected between the reception antenna 6D and the control circuit 6B. The radio signal reception circuit 6C is configured in the same manner as in the radio signal reception circuit 4C in the first fixed station 4. This radio signal reception circuit 6C calculates the phase difference $\Delta\phi mf3$ between the carrier phase Pm of the first radio signal S1 received with the reception antenna 6D and the phase Pf3 of the reference clock Cf3. In addition, the radio signal reception circuit 6C calculates the phase differences $\Delta\phi sbf3$ and $\Delta\phi scf3$ between the carrier phases Ps of the multiple second radio signals S2 received with the reception antenna 6D and the phase Pf3 of the reference clock Cf3.

The server 7 is connected to the respective fixed stations 4 to 6. The server 7 calculates the position of the mobile station 2 using the phase differences $\Delta\phi mf1$, $\Delta\phi mf2$, and $\Delta\phi mf3$, each of which is phase difference information between the mobile station 2 and the respective fixed stations 4 to 6, and the phase differences $\Delta\phi sbf1$, $\Delta\phi scf1$, $\Delta\phi sbf2$, $\Delta\phi scf2$, $\Delta\phi sbf3$, and $\Delta\phi scf3$, each of which is phase difference information between the reference station 3 and the respective fixed stations 4 to 6. In this case, the server 7 may be connected to the respective fixed stations 4 to 6 through wired connection using a physical cable or through wireless connection.

Next, a position detection method performed by the position detection system 1 according to the present embodiment will now be described with reference to FIG. 6 to FIG. 10.

Figure 10:
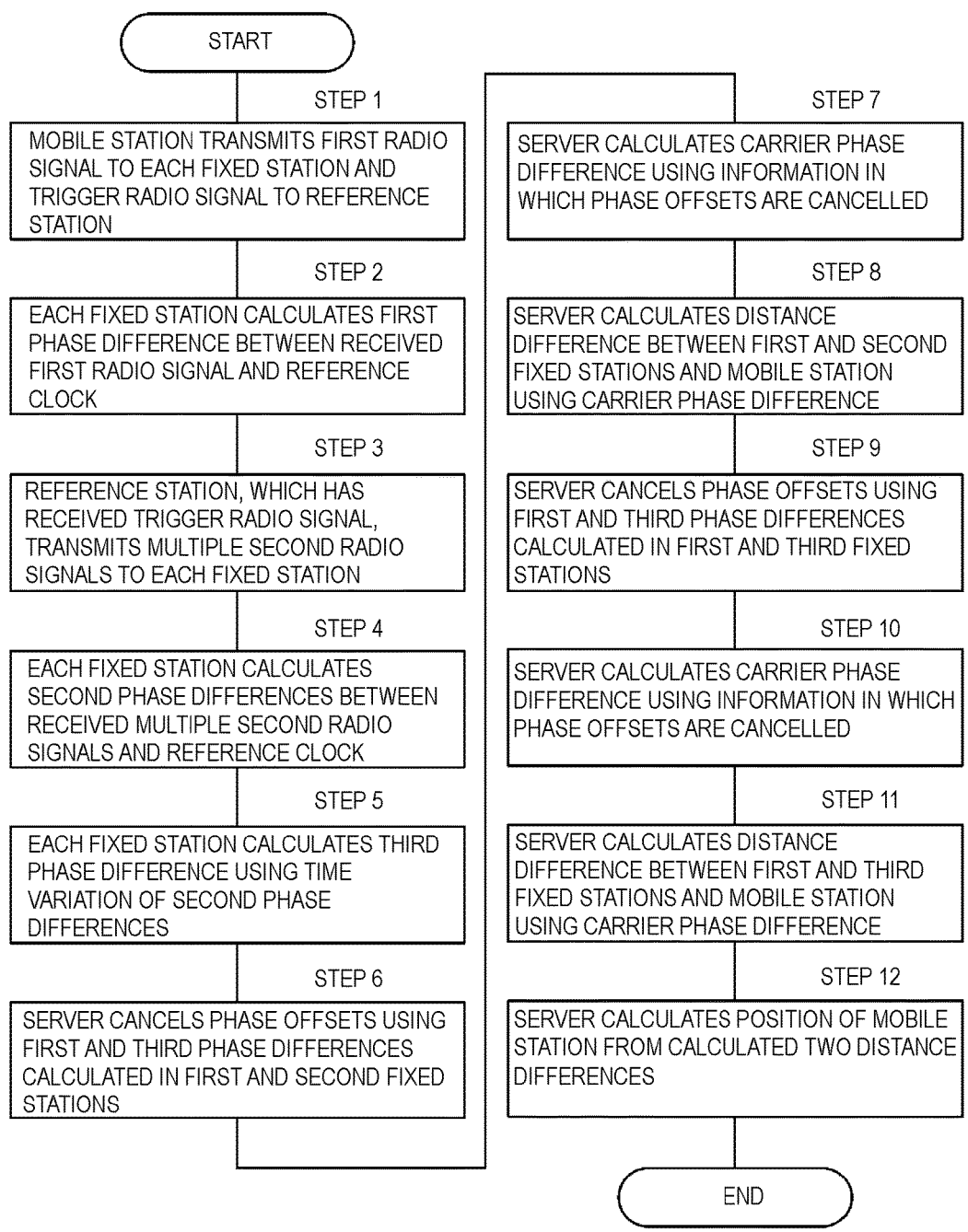
FIG. 10 is a flowchart illustrating the entire process performed by the position detection system according to the first embodiment.

Referring to FIG. 10, Step 1 indicates a specific example of a first radio signal transmission element. In Step 1, the mobile station 2 transmits the first radio signal S1 to each of the fixed stations 4 to 6. In addition, the mobile station 2 transmits the trigger radio signal St used by the reference station 3 to transmit the second radio signals S2 (refer to FIG. 7). Here, the carrier phase Pm of the first radio signal S1 transmitted by the mobile station 2 at a time t0$a$ is represented by Formula 6 described below.

$$Pm=\omega m\cdot t0a+\phi m \qquad \text{[Formula 6]}$$

Step 2 indicates a specific example of a first phase difference calculation element. In Step 2, the respective fixed stations 4 to 6 calculate the first phase differences $\Delta\phi mf1$ to $\Delta\phi mf3$ between the carrier phase Pm of the received first radio signal S1 and the phases Pf1 to Pf3 of the reference clocks Cf1 to Cf3. Specifically, the phase Pf1 of the reference clock Cf1 is represented by Formula 7 described below, and the first phase difference $\Delta\phi mf1$ between the carrier phase Pm of the first radio signal S1 and the phase Pf1 of the reference clock Cf1 is represented by Formula 8 described below where the time when the first fixed station 4 receives the first radio signal S1 is denoted by t1$a$.

$$Pf1=\omega f1\cdot t1a+\phi f1 \qquad \text{[Formula 7]}$$

$$\Delta\phi mf1=Pm-Pf1=\omega m\cdot t0a-\omega f1\cdot t1a+\phi m-\phi f1 \qquad \text{[Formula 8]}$$

Similarly, the phase Pf2 of the reference clock Cf2 is represented by Formula 9 described below, and the first phase difference $\Delta\phi mf2$ between the carrier phase Pm of the first radio signal S1 and the phase Pf2 of the reference clock Cf2 is represented by Formula 10 described below where the time when the second fixed station 5 receives the first radio signal S1 is denoted by t2a.

$$Pf1=\omega f1 \cdot t2a+\phi f2 \quad [\text{Formula 9}]$$

$$\Delta\phi mf2=Pm-Pf2=\omega m \cdot t0a-\omega f2 \cdot t2a+\phi m-\phi f2 \quad [\text{Formula 10}]$$

Similarly, the phase Pf3 of the reference clock Cf3 is represented by Formula 11 described below, and the first phase difference $\Delta\phi mf3$ between the carrier phase Pm of the first radio signal S1 and the phase Pf3 of the reference clock Cf3 is represented by Formula 12 described below where the time when the third fixed station 6 receives the first radio signal S1 is denoted by t3a.

$$Pf3=\omega f3 \cdot t3a+\phi f3 \quad [\text{Formula 11}]$$

$$\Delta\phi mf3=Pm-Pf3=\omega m \cdot t0a-\omega f3 \cdot t3a+\phi m-\phi f3 \quad [\text{Formula 12}]$$

Step 3 indicates a specific example of a second radio signal transmission element. In Step 3, the reference station 3, which has received the trigger radio signal St, transmits the multiple second radio signals S2 (for example, two times) to each of the fixed stations 4 to 6. In this case, the reference station 3, which has received the trigger radio signal St at a time tka, may transmit the second radio signal S2 after a predetermined time elapses. The time difference between a time t0b and a time t0c is set within a range, for example, in which the variations in second phase differences (the difference between the phase difference $\Delta\phi sbf1$ and the phase difference $\Delta\phi scf1$, the difference between the phase difference $\Delta\phi sbf2$ and the phase difference $\Delta\phi scf2$, and the difference between the phase difference $\Delta\phi sbf3$ and the phase difference $\Delta\phi scf3$) are lower than or equal to $2\pi$.

Carrier phase Ps1 of the first-time second radio signal S2 transmitted by the reference station 3 at the time t0b is represented by Formula 13 described below. Carrier phase Ps2 of the second-time second radio signal S2 transmitted by the reference station 3 at the time t0c is represented by Formula 14 described below.

$$Ps1=\omega s \cdot t0b+\phi s \quad [\text{Formula 13}]$$

$$Ps2=\omega s \cdot t0c+\phi s \quad [\text{Formula 14}]$$

Step 4 indicates a specific example of a second phase difference calculation element. In Step 4, the respective fixed stations 4 to 6 calculate the second phase differences $\Delta\phi sbf1$ to $\Delta\phi sbf3$ and $\Delta\phi scf1$ to $\Delta\phi scf3$ between the carrier phases Ps1 and Ps2 of the received second radio signals S2 and the phases Pf1 to Pf3 of the reference clocks Cf1 to Cf3. Specifically, the phase Pf1 of the reference clock Cf1 is represented by Formula 15 described below, and the second phase difference $\Delta\phi sbf1$ between the carrier phase Ps1 of the second radio signal S2 and the phase Pf1 of the reference clock Cf1 is represented by Formula 16 described below where the time when the first fixed station 4 receives the first-time second radio signal S2 is denoted by t1b.

$$Pf1=\omega f1 \cdot t1b+\omega f1 \quad [\text{Formula 15}]$$

$$\Delta\phi sbf1=Ps1-Pf1=\omega s \cdot t0b-\omega f1 \cdot t1b+\phi s-\phi f1 \quad [\text{Formula 16}]$$

In addition, the phase Pf1 of the reference clock Cf1 is represented by Formula 17 described below, and the second phase difference $\Delta\phi scf1$ between the carrier phase Ps2 of the second radio signal S2 and the phase Pf1 of the reference clock Cf1 is represented by Formula 18 described below where the time when the first fixed station 4 receives the second-time second radio signal S2 is denoted by t1c.

$$Pf1=\omega f1 \cdot t1c+\omega f1 \quad [\text{Formula 17}]$$

$$\Delta\phi scf1=Ps2-Pf1=\omega s \cdot t0c-\omega f1 \cdot t1c+\phi s-\phi f1 \quad [\text{Formula 18}]$$

Similarly, the phase Pf2 of the reference clock Cf2 is represented by Formula 19 described below, and the second phase difference $\Delta\phi sbf2$ between the carrier phase Ps1 of the second radio signal S2 and the phase Pf2 of the reference clock Cf2 is represented by Formula 20 described below where the time when the second fixed station 5 receives the first-time second radio signal S2 is denoted by t2b.

$$Pf2=\omega f2 \cdot t2b+\phi f2 \quad [\text{Formula 19}]$$

$$\Delta\phi sbf2=Ps1-Pf2=\omega s \cdot t0b-\omega f2 \cdot t2b+\phi s-\phi f2 \quad [\text{Formula 20}]$$

In addition, the phase Pf2 of the reference clock Cf2 is represented by Formula 21 described below, and the second phase difference $\Delta\phi scf2$ between the carrier phase Ps2 of the second radio signal S2 and the phase Pf2 of the reference clock Cf2 is represented by Formula 22 described below where the time when the second fixed station 5 receives the second-time second radio signal S2 is denoted by t2c.

$$Pf2=\omega f2 \cdot t2c+\phi f2 \quad [\text{Formula 21}]$$

$$\Delta\phi scf2=Ps2-Pf2=\omega s \cdot t0c-\omega f2 \cdot t2c+\phi s-\phi f2 \quad [\text{Formula 22}]$$

Similarly, the phase Pf3 of the reference clock Cf3 is represented by Formula 23 described below, and the second phase difference $\Delta\phi sbf3$ between the carrier phase Ps1 of the second radio signal S2 and the phase Pf3 of the reference clock Cf3 is represented by Formula 24 described below where the time when the third fixed station 6 receives the first-time second radio signal S2 is denoted by t3b.

$$Pf3=\omega f2 \cdot t3b+\phi f3 \quad [\text{Formula 23}]$$

$$\Delta\phi sbf3=Ps1-Pf3=\omega s \cdot t0b-\omega f3 \cdot t3b+\phi s-\phi f3 \quad [\text{Formula 24}]$$

In addition, the phase Pf3 of the reference clock Cf3 is represented by Formula 25 described below, and the second phase difference $\Delta\phi scf3$ between the carrier phase Ps2 of the second radio signal S2 and the phase Pf3 of the reference clock Cf3 is represented by Formula 26 described below where the time when the third fixed station 6 receives the second-time second radio signal S2 is denoted by t3c.

$$Pf3=\omega f3 \cdot t3c+\phi f3 \quad [\text{Formula 25}]$$

$$\Delta\phi scf3=Ps2-Pf3=\omega s \cdot t0c-\omega f3 \cdot t3c+\phi s-\phi f3 \quad [\text{Formula 26}]$$

Step 5 indicates a specific example of a third phase difference calculation element. In Step 5, the first to third fixed stations 4 to 6 calculate time variations $\Delta\phi1/\Delta t$, $\Delta\phi2/\Delta t$, and $\Delta\phi3/\Delta t$ of the second phase differences $\Delta\phi sbf1$ to $\Delta\phi sbf3$ and $\Delta\phi scf1$ to $\Delta\phi scf3$ based on the multiple second phase differences $\Delta\phi sbf1$ to $\Delta\phi sbf3$ and $\Delta\phi scf1$ to $\Delta\phi scf3$ calculated by the first to third fixed stations 4 to 6. Then, the first to third fixed stations 4 to 6 calculate third phase differences $\Delta\phi saf1$ to $\Delta\phi saf3$ between the carrier phase Ps of the second radio signal S2 and the phases Pf1 to Pf3 of the reference clocks Cf1 to Cf3 at the timing when the first radio signal S1 is received based on the time variations $\Delta\phi1/\Delta t$, $\Delta\phi2/\Delta t$, and $\Delta\phi3/\Delta t$.

Figure 6:
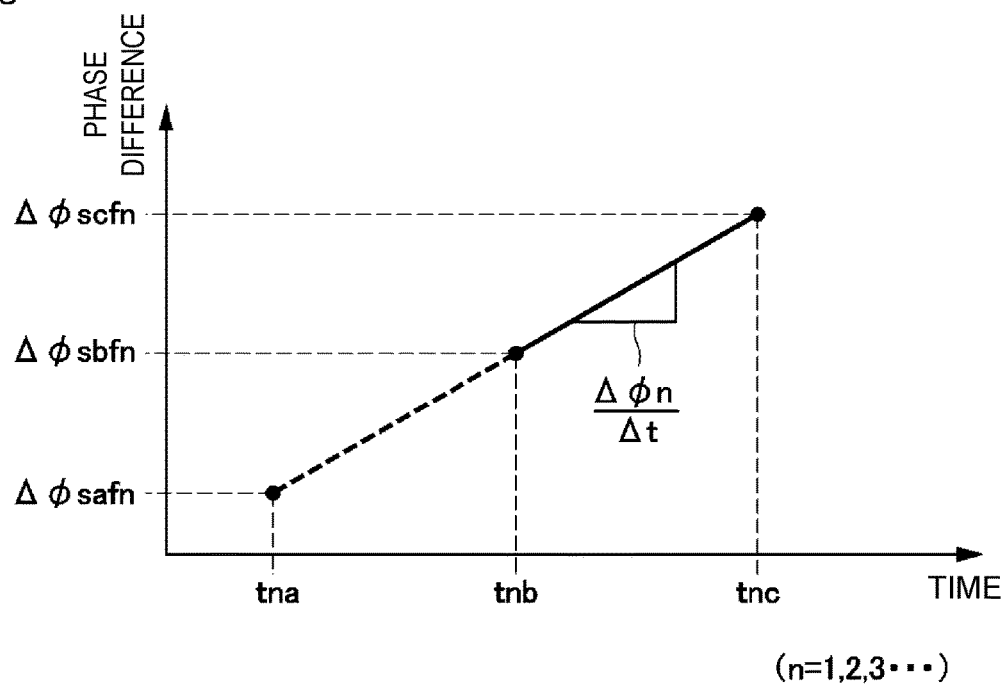
FIG. 6 is an explanatory drawing indicating the relationship between the time when a second radio signal is received and second and third phase differences.
Figure 7:
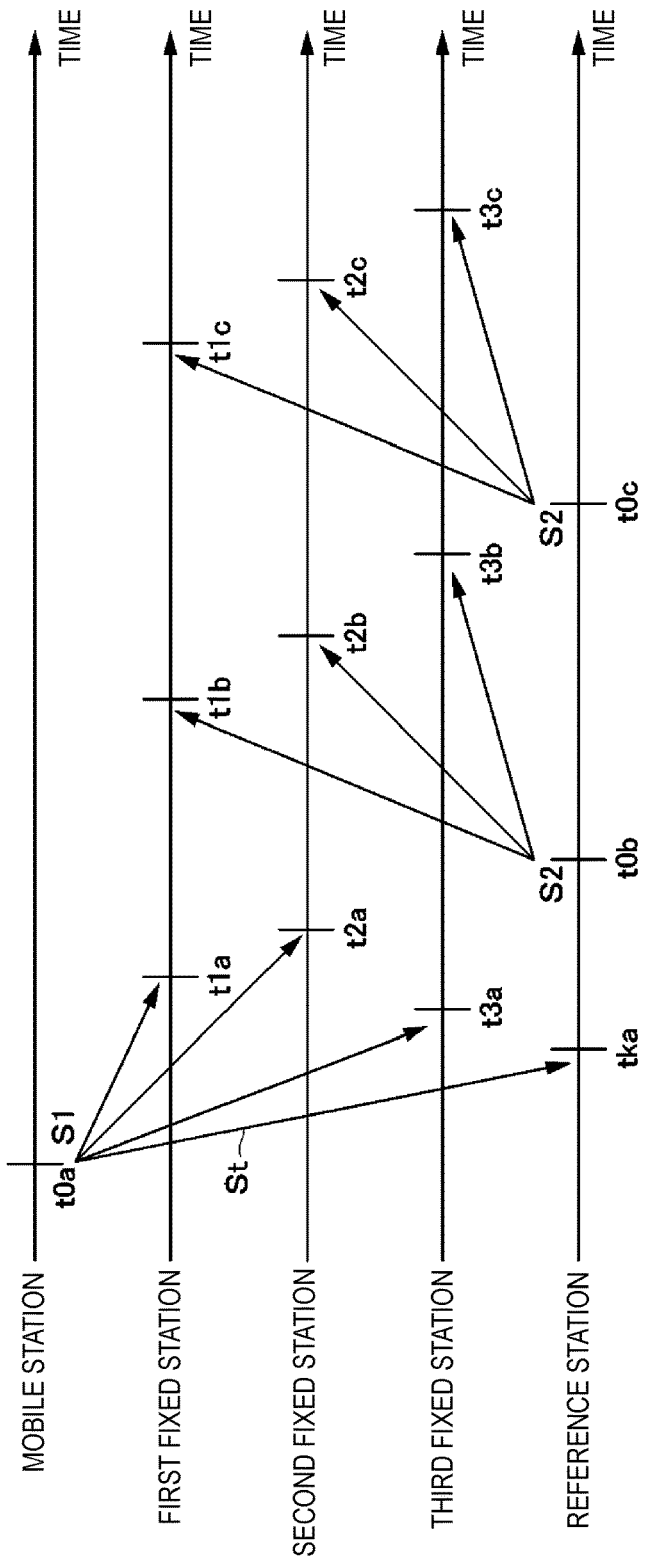
FIG. 7 is an explanatory drawing indicating the timing of transmission and reception of radio signals in the position detection system according to the first embodiment.

Specifically, as illustrated in FIG. 6, the first fixed station 4 calculates the third phase difference $\Delta\phi saf1$ at the time t1a when the first fixed station 4 has received the first radio signal S1 using extrapolation based on information about the second phase differences $\Delta\phi sbf1$ and $\Delta\phi scf1$ calculated at the times t1b and t1c (refer to Formula 30). Similarly, the second fixed station 5 calculates the third phase difference Δϕsaf2 at the time t2a when the second fixed station 5 has received the first radio signal S1 based on information about the second phase differences Δϕsbf2 and Δϕscf2 calculated at the times t2b and t2c (refer to Formula 31). Similarly, the third fixed station 6 calculates the third phase difference Δϕsaf3 at the time t3a when the third fixed station 6 has received the first radio signal S1 based on information about the second phase differences Δϕsbf3 and Δϕscf3 calculated at the times t3b and t3c (refer to Formula 32). In this case, the relationship between the time t0b and the time t0c, between the time t1b and time t1c, between the time t2b and the time t2c, and between the time t3b and the time t3c is represented by Formula 27, and Formula 28 and Formula 29 are derived from Formula 27.

$$t0c - t0b = t1c - t1b = t2c - t2b = t3c - t3b \quad \text{[Formula 27]}$$

$$t2c - t1c = t2b - t1b \quad \text{[Formula 28]}$$

$$t3c - t1c = t3b - t1b \quad \text{[Formula 29]}$$

$$\begin{aligned}
\Delta\phi saf1 &= t1a \cdot \frac{\Delta\phi 1}{\Delta t} + \frac{\Delta\phi sbf1 \cdot t1c - \Delta\phi scf1 \cdot t1b}{t1c - t1b} \\
&= t1a \cdot \frac{\Delta\phi scf1 - \Delta\phi sbf1}{t1c - t1b} + \frac{\Delta\phi sbf1 \cdot t1c - \Delta\phi scf1 \cdot t1b}{t1c - t1b} \\
&= t1a(\omega s - \omega f1) + \phi s - \phi f1 + \frac{\omega s(t0b \cdot t1c - t0c \cdot t1b)}{t1c - t1b}
\end{aligned} \quad \text{[Formula 30]}$$

$$\begin{aligned}
\Delta\phi saf2 &= t2a \cdot \frac{\Delta\phi 2}{\Delta t} + \frac{\Delta\phi sbf2 \cdot t2c - \Delta\phi scf2 \cdot t2b}{t2c - t2b} \\
&= t2a \cdot \frac{\Delta\phi scf2 - \Delta\phi sbf2}{t2c - t2b} + \frac{\Delta\phi sbf2 \cdot t2c - \Delta\phi scf2 \cdot t2b}{t2c - t2b} \\
&= t2a(\omega s - \omega f2) + \phi s - \phi f2 + \frac{\omega s(t0b \cdot t2c - t0c \cdot t2b)}{t2c - t2b}
\end{aligned} \quad \text{[Formula 31]}$$

$$\begin{aligned}
\Delta\phi saf3 &= t3a \cdot \frac{\Delta\phi 3}{\Delta t} + \frac{\Delta\phi sbf3 \cdot t3c - \Delta\phi scf3 \cdot t3b}{t3c - t3b} \\
&= t3a \cdot \frac{\Delta\phi scf3 - \Delta\phi sbf3}{t3c - t3b} + \frac{\Delta\phi sbf3 \cdot t3c - \Delta\phi scf3 \cdot t3b}{t3c - t3b} \\
&= t3a(\omega s - \omega f3) + \phi s - \phi f3 + \frac{\omega s(t0b \cdot t3c - t0c \cdot t3b)}{t3c - t3b}
\end{aligned} \quad \text{[Formula 32]}$$

Step 6 indicates a specific example of a phase offset cancel element. In Step 6, the server 7 cancels the phase offsets ϕm, ϕs, ϕf1, and ϕf2 of the reference clocks Cm, Cs, Cf1, and Cf2 at the mobile station 2, the reference station 3, and the first and second fixed stations 4 and 5 using the first phase differences Δϕmf1 and Δϕmf2 and the third phase differences Δϕsaf1 and Δϕsaf2, which are calculated by the first and second fixed stations 4 and 5. In other words, as represented by Formula 33 described below, first phase difference information and third phase difference information, calculated by the first fixed station 4, are subtracted from the first phase difference information and the third phase difference information, calculated by the second fixed station 5, to calculate a phase difference ϕ21 in which the phase offsets ϕm, ϕs, ϕf1, and ϕf2 by the mobile station 2, the reference station 3, and the first and second fixed stations 4 and 5 are cancelled.

$$\Delta\phi 21 = (\Delta\phi saf2 - \Delta\phi mf2) - (\Delta\phi saf1 - \Delta\phi mf1) = \omega s(t2a - t1a - t2b + t1b) \quad \text{[Formula 33]}$$

Step 7 indicates a specific example of a carrier phase difference calculation element. In Step 7, the server 7 calculates a carrier phase difference Δ21 between the first fixed station 4 and the second fixed station 5 using the phase difference Δ21, which is information resulting from cancellation of the phase offsets ϕm, ϕs, ϕf1, and ϕf2. In other words, the carrier phase difference Δ21 is calculated according to Formula 34 described below based on Formula 33 described above.

$$\Delta 21 = \omega s(t2a - t1a) = \Delta\phi 21 + \omega s(t1b - t2b) \quad \text{[Formula 34]}$$

Here, ωs(t1b−t2b) indicated in the second term of the right side of Formula 34 is calculated in advance from the relationship between the reference station 3 and the respective fixed stations 4 and 5, which are disposed at predetermined positions. The server 7 calculates the carrier phase difference Δ21 in the above manner.

Step 8 indicates a specific example of a distance difference calculation element. In Step 8, the server 7 calculates a distance difference Δr12 (=r1−r2) between the distance r1 between the first fixed station 4 and the mobile station 2 and the distance r2 between the second fixed station 5 and the mobile station 2 using the carrier phase difference Δ21. In this case, since calculating the carrier phase difference Δ21 enables the difference between the times when the first radio signal S1 (or the second radio signal S2) reaches the respective fixed stations 4 and 5 to be calculated, the distance difference Δr12, which is distance information, is capable of being calculated using, for example, a Time Differential Of Arrival (TDOA) method.

Figure 8:
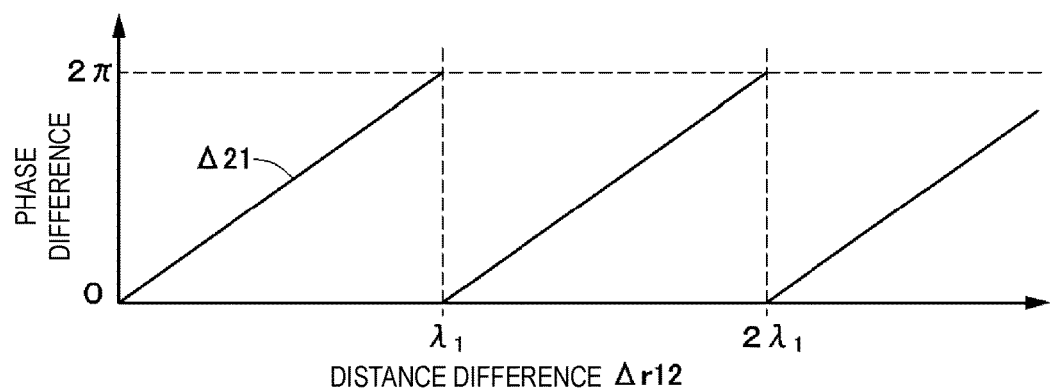
FIG. 8 is an explanatory drawing indicating the relationship between a carrier phase difference of a first radio signal and a distance difference.

Since the carrier phase difference Δ21 periodically appears every 2π, the absolute value of the carrier phase difference Δ21 is not directly calculated. Accordingly, uncertainty of 2nπ (n is an integer) exists and the distance difference Δr12 for the carrier phase difference Δ21 exists infinitely. For example, as illustrated in FIG. 8, the distance difference Δr12, which is an integral multiple of a wavelength $\lambda_1$, is calculated each time the carrier phase difference Δ21 reaches 2π where $\lambda_1$ denotes the wavelength of the first radio signal S1.

Figure 9:
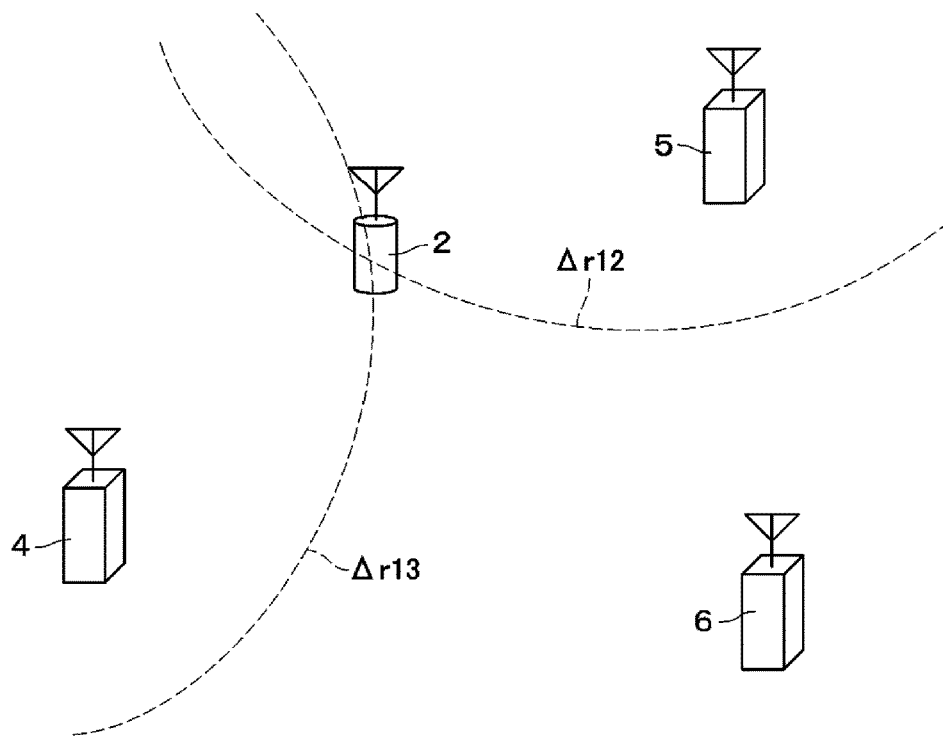
FIG. 9 is an explanatory drawing indicating a hyperbolic curve of the distance difference between a first fixed station and a second fixed station and a hyperbolic curve of the distance difference between the first fixed station and a third fixed station.

In order to remove the uncertainty of 2nπ, the position detection system 1 corrects the carrier phase difference Δ21 in a state in which the position of the mobile station 2 is identified and uses the variation from the position. Accordingly, the position detection system 1 is capable of uniquely calculating the carrier phase difference Δ21 and acquiring a hyperbolic curve of the distance difference Δr12 in which the mobile station 2 can exist, as illustrated in FIG. 9.

Step 9 indicates a specific example of the phase offset cancel element. In Step 9, the server 7 cancels the phase offsets φm, φs, φf1, and φf3 of the reference clocks Cm, Cs, Cf1, and Cf3 at the mobile station 2, the reference station 3, and the first and third fixed stations 4 and 6 using the first phase differences Δφmf1 and Δφmf3 and the third phase differences Δφsaf1 and Δφsaf3, which are calculated by the first and third fixed stations 4 and 6. In other words, as represented by Formula 35 described below, first phase difference information and third phase difference information, calculated by the first fixed station 4, are subtracted from the first phase difference information and the third phase difference information, calculated by the third fixed station 6, to calculate a phase difference Δφ31 in which the phase offsets φm, φs, φf1, and φf3 by the mobile station 2, the reference station 3, and the first and third fixed stations 4 and 6 are cancelled.

$$\Delta\phi 31=(\Delta\phi saf3-\Delta\phi mf3)-(\Delta\phi saf1-\Delta\phi mf1)=\omega s(t3a-t1a-t3b+t1b) \quad \text{[Formula 35]}$$

Step 10 indicates a specific example of the carrier phase difference calculation element. In Step 10, the server 7 calculates a carrier phase difference Δ31 between the first fixed station 4 and the third fixed station 6 using the phase difference Δφ31, which is information resulting from cancellation of the phase offsets φm, φs, φf1, and φf3. In other words, the carrier phase difference Δ31 is calculated according to Formula 36 described below based on Formula 35 described above.

$$\Delta 31=\omega s(t3a-t1a)=\Delta\phi 31+\omega s(t1b-t3b) \quad \text{[Formula 36]}$$

Here, ωs(t1b–t3b) indicated in the second term of the right side of Formula 36 is calculated in advance from the relationship between the reference station 3 and the respective fixed stations 4 and 6, which are disposed at predetermined positions. The server 7 calculates the carrier phase difference Δ31 in the above manner.

Step 11 indicates a specific example of the distance difference calculation element. In Step 11, the server 7 calculates a distance difference Δr13 (=r1=r3) between the first and third fixed stations 4 and 6 and the mobile station 2 using the carrier phase difference Δ31. In this case, the distance difference Δr13 is capable of being calculated from the carrier phase difference Δ431 using, for example, the TDOA method.

Step 12 indicates a specific example of a mobile station position calculation element. In Step 12, the server 7 calculates the position of the mobile station 2 from the calculated two distance differences Δr12 and Δr13. Specifically, as illustrated in FIG. 9, the server 7 is capable of calculating the position of the mobile station 2 from the intersection between the hyperbolic curve of the distance difference Δr12 and a hyperbolic curve of the distance difference Δr13.

As described above, according to the first embodiment, the position detection system 1 is configured so as to calculate the position of the mobile station 2 using the phase difference information between the mobile station 2 and the respective fixed stations 4 to 6 and the phase difference information between the reference station 3 and the respective fixed stations 4 to 6. In this case, since the carrier phase differences Δ21 and Δ31 of the first radio signal S1 reaching the respective fixed stations 4 to 6 are used, distance resolution shorter than the wavelength $\lambda_1$ of the first radio signal S1 is capable of being realized. Accordingly, since the narrowband radio signals are capable of being used even when the position of the mobile station 2 is detected with the distance resolution being improved, the occupied bandwidth of the radio signals is capable of being narrowed, compared with the case in which the pulse signals are used.

In addition, the position detection system 1 cancels the phase offsets φm, φs, and φf1 to φf3 by the mobile station 2, the reference station 3, and the respective fixed stations 4 to 6 using the first phase differences Δφmf1 to Δφmf3 between the mobile station 2 and the respective fixed stations 4 to 6 and the third phase differences Δφsaf1 to Δφsaf3 between the reference station 3 and the respective fixed stations 4 to 6. Accordingly, since it is not necessary to achieve synchronization between the respective fixed stations 4 to 6, the mobile station 2, and the reference station 3, the system building is capable of being simplified.

Specifically, the position detection system 1 calculates the time variations Δφ1/Δt, Δφ2/Δt, and Δφ3/Δt of the second phase differences Δφsbf1 to Δφsbf3 and Δφscf1 to Δφscf3 based on the multiple second phase differences Δφsbf1 to Δφsbf3 and Δφscf1 to Δφscf3 between the reference station 3 and the respective fixed stations 4 to 6. In addition, the position detection system 1 is configured so as to calculate the third phase differences Δφsaf1 to Δφsaf3 between the carrier phase Ps included in the second radio signal S2 and the respective reference clocks Cf1 to Cf3 of the respective fixed stations 4 to 6 at the timing when the first radio signal S1 is received. Accordingly, it is possible to cancel the phase offsets φm, φs, and φf1 to φf3 by the mobile station 2, the reference station 3, and the respective fixed stations 4 to 6 using the first phase differences Δφmf1 to Δφmf3 between the mobile station 2 and the respective fixed stations 4 to 6 and the third phase differences Δφsaf1 to Δφsaf3 between the reference station 3 and the respective fixed stations 4 to 6 at the timing when the first radio signal S1 is received. As a result, since the timing when the first phase differences Δφmf1, Δφmf2, and Δφmf3 are extracted is capable of being synchronized with the timing when the third phase differences Δφsaf1 to Δφsaf3 are calculated, the accuracy of phase correction is improved to realize the position detection with high accuracy.

In addition, calculating the third phase differences Δφsaf1 to Δφsaf3 at the timing when the first radio signal S1 is received enables the phase offsets φm, φs, and φf1 to φf3 by the mobile station 2, the reference station 3, and the respective fixed stations 4 to 6 to be cancelled even when the angular frequencies ωf1 to ωf3 of the reference clocks Cf1 to Cf3 of the respective fixed stations 4 to 6 are different from each other.

Furthermore, the mobile station 2 is configured so as to transmit the trigger radio signal St, and the reference station 3 is configured so as to transmit the multiple second radio signals S2 upon reception of the trigger radio signal St transmitted from the mobile station 2. Accordingly, the intervals (t1c-t1a, t2c-t2a, and t3c-t3a) between the times t1a, t2a, and t3a when the respective fixed stations 4 to 6 receive the first radio signal S1 from the mobile station 2 and the times t1c, t2c, and t3c when the respective fixed stations 4 to 6 receive the second radio signal S2 from the reference station 3 are capable of being shortened. As a result, since the phase rotation caused by the frequency deviation between the respective fixed stations 4 to 6 is capable of being suppressed, the accuracy of the phase correction is improved to realize the position detection with high accuracy.

Figure 11:
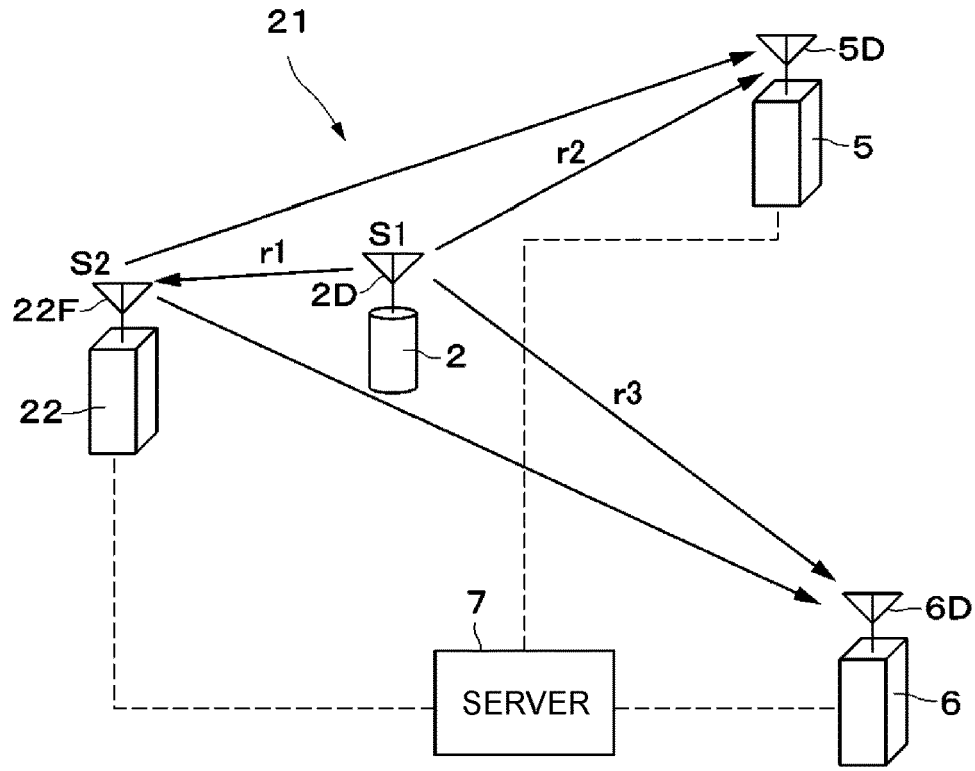
FIG. 11 is a block diagram illustrating the entire configuration of a position detection system according to a second embodiment.
Figure 12:
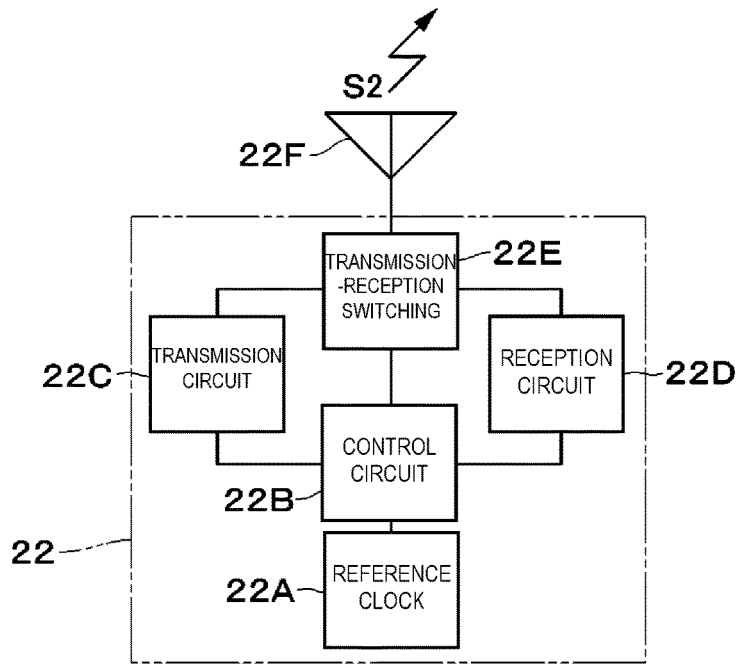
FIG. 12 is a block diagram illustrating the entire configuration of a first fixed station according to the second embodiment.
Figure 13:
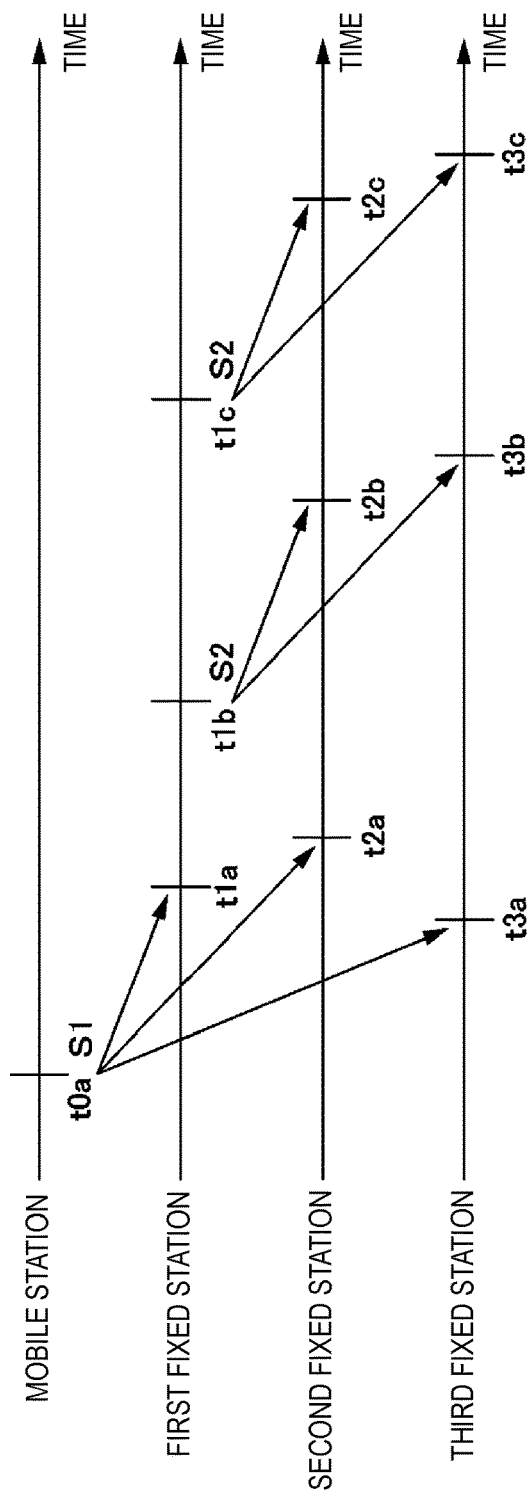
FIG. 13 is an explanatory drawing indicating the timing of transmission and reception of radio signals in the position detection system according to the second embodiment.

Next, a position detection system according to a second embodiment of the present disclosure will now be described with reference to FIG. 11 to FIG. 13. The second embodiment is characterized in that the first fixed station is configured so as to function as the reference station. The same reference numerals are used in the second embodiment to identify the same components as those in the first embodiment described above. A description of such components is omitted herein.

A position detection system 21 according to the second embodiment is configured in substantially the same manner as in the position detection system 1 according to the first embodiment. Accordingly, the position detection system 21 includes the mobile station 2, a first fixed station 22, the second fixed station 5, the third fixed station 6, the server 7, and so on. However, since the first fixed station 22 also functions as the reference station, the first fixed station 22 includes a radio signal transmission circuit 22C and a transmission-reception antenna 22F. The second embodiment differs from the first embodiment in this point.

The first fixed station 22 is disposed at a predetermined position different from those of the second and third fixed stations 5 and 6. As illustrated in FIG. 12, this first fixed station 22 includes a fixed station reference clock circuit 22A, a control circuit 22B, the radio signal transmission circuit 22C, a radio signal reception circuit 22D, a transmission-reception switching circuit 22E, the transmission-reception antenna 22F, and so on. This first fixed station 22 also functions as the reference station and transmits the second radio signal S2 to each of the fixed stations 5 and 6.

The fixed station reference clock circuit 22A includes, for example, an oscillator. This fixed station reference clock circuit 22A generates the reference clock Cf1 of the angular frequency ωf1 (carrier frequency), on which the second radio signal S2 is based, for the transmission-reception antenna 22F. The control circuit 22B is composed of, for example, a microcomputer. The control circuit 22B controls, for example, an operation to intermittently transmit the second radio signal S2 by the first fixed station 22.

The radio signal transmission circuit 22C is connected to the control circuit 22B and the transmission-reception switching circuit 22E. This radio signal transmission circuit 22C includes, for example, a modulation circuit and an amplifier. The radio signal transmission circuit 22C generates the second radio signal S2 based on the reference clock Cf1. In contrast, the radio signal reception circuit 22D is connected to the control circuit 22B and the transmission-reception switching circuit 22E. The radio signal reception circuit 22D includes, for example, a mixer and a phase shifter (which are not illustrated). This radio signal reception circuit 22D calculates the phase difference Δϕmf1 between the carrier phase Pm of the first radio signal S1 received with the transmission-reception antenna 22F and the phase Pf1 of the reference clock Cf1.

The radio signal transmission circuit 22C and the radio signal reception circuit 22D are connected to the transmission-reception antenna 22F with the transmission-reception switching circuit 22E disposed therebetween. This transmission-reception switching circuit 22E switches between transmission and reception in response to an instruction from the control circuit 22B, supplies the second radio signal S2 from the radio signal transmission circuit 22C to the transmission-reception antenna 22F, and supplies the first radio signal S1 received with the transmission-reception antenna 22F to the radio signal reception circuit 22D. The transmission-reception antenna 22F is composed of various antennas capable of radiating the second radio signal S2.

The transmission-reception antenna 22F transmits the second radio signal S2 to each of the fixed stations 5 to 6.

Next, a position detection method performed by the position detection system 21 according to the second embodiment will now be described. The position detection system 21 according to the second embodiment calculates the position of the mobile station 2 using the position detecting method illustrated in FIG. 10, as in the position detection system 1 according to the first embodiment described above.

In this case, the first fixed station 22 calculates the second phase differences Δϕsbf1 and Δϕscf1 using the times t1$b$ and t1$c$ when the first fixed station 22 transmits the second radio signal S2 as the times when the first fixed station 22 receives the second radio signal S2. In other words, the carrier phase Ps of the second radio signal S2 transmitted by the first fixed station 22 and the phase Pf1 of the second radio signal S2 received by the first fixed station 22 are in phase with each other because the times t1$b$ and t1$c$ when the first fixed station 22 transmits the second radio signal S2 are equal to the times when the first fixed station 22 receives the second radio signal S2 and are represented by Formula 37 described below.

$$Ps=Pf1 \quad \text{[Formula 37]}$$

Accordingly, the second phase differences Δϕsbf1 and Δϕscf1 in the first fixed station 22 have the value represented by Formula 38 described below.

$$\Delta\phi sbf1 = \Delta\phi scf1 = Ps - Pf1 = 0 \quad \text{[Formula 38]}$$

The third phase difference Δϕsaf1 using the extrapolation is represented by Formula 39 described below based on the information about the second phase differences Δϕsbf1 and Δϕscf1 calculated according to Formula 38.

[Formula 39]
$$\begin{aligned}\Delta\phi saf1 &= t1a \cdot \frac{\Delta\phi 1}{\Delta t} + \frac{\Delta\phi sbf1 \cdot t1c - \Delta\phi scf1 \cdot t1b}{t1c - t1b} \\ &= t1a \cdot \frac{\Delta\phi scf1 - \Delta\phi sbf1}{t1c - t1b} + \frac{\Delta\phi sbf1 \cdot t1c - \Delta\phi scf1 \cdot t1b}{t1c - t1b} \\ &= 0\end{aligned}$$

The phase difference Δϕ21 resulting from cancellation of the phase offsets ϕm, ϕs, ϕf1, and ϕf2 between the mobile station 2 and the first and second fixed stations 22 and 5 is represented by Formula 40 described below using Formula 8, Formula 10, Formula 31, and Formula 39 described above.

[Formula 40]
$$\begin{aligned}\Delta\phi 21 &= (\Delta\phi saf2 - \Delta\phi mf2) - (\Delta\phi saf1 - \Delta\phi mf1) \\ &= \omega s\left(t2a - t1a + \frac{t1b \cdot t2c - t1c \cdot t2b}{t1c - t1b}\right)\end{aligned}$$

Similarly, the phase difference Δϕ31 resulting from cancellation of the phase offsets ϕm, ϕf1, and ϕf3 between the mobile station 2 and the first and third fixed stations 22 and 6 is represented by Formula 41 described below using Formula 8, Formula 12, Formula 32, and Formula 39 described above.

$$\Delta\phi 31 = (\Delta\phi saf3 - \Delta\phi mf3) - (\Delta\phi saf1 - \Delta\phi mf1)$$
$$= \omega s\left(t3a - t1a + \frac{t1b \cdot t3c - t1c \cdot t3b}{t1c - t1b}\right)$$

[Formula 41]

As described above, substantially the same effects and advantages as those in the first embodiment are achieved also in the second embodiment. In the second embodiment, the first fixed station 22 also functions as the reference station and is configured so as to transmit the second radio signal S2. In this case, since the phase offsets ϕm and ϕf1 to ϕf3 by the mobile station 2 and the respective fixed stations 4 to 6 are capable of being cancelled using the second radio signals S2 transmitted from the first fixed station 22, it is not necessary to separately provide the reference station. As a result, since the system is capable of simply being built, it is possible to reduce the cost.

Next, a position detection system according to a third embodiment of the present disclosure will now be described with reference to FIG. 1 and FIG. 14 to FIG. 16. The third embodiment is characterized in that the mobile station transmits the first radio signals of two or more kinks of carrier frequencies, and the reference station transmits the second radio signals of carrier frequencies of two or more kinds. The same reference numerals are used in the third embodiment to identify the same components as those in the first and second embodiments described above. A description of such components is omitted herein.

A position detection system 31 according to the third embodiment is configured in substantially the same manner as in the position detection system 1 according to the first embodiment. Accordingly, the position detection system 31 includes the mobile station 2, the reference station 3, the first fixed station 4, the second fixed station 5, the third fixed station 6, the server 7, and so on.

Here, the mobile station 2 transmits first radio signals S1 and S1' of carrier frequencies (angular frequencies) of two kinds to each of the fixed stations 4 to 6. In this case, the mobile station reference clock circuit 2A in the mobile station 2 generates reference clocks Cm and Cm' of two frequencies. Specifically, the mobile station reference clock circuit 2A generates the reference clock Cm of the angular frequency ωm, on which the first radio signal S1 is based, and the reference clock Cm' of an angular frequency ωm', on which the first radio signal S1' is based.

The reference station 3 transmits second radio signal S2 and S2' of carrier frequencies (angular frequencies) of two kinds to each of the fixed stations 4 to 6. In this case, the reference station reference clock circuit 3A in the reference station 3 generates reference clocks Cs and Cs' of two frequencies. Specifically, the reference station reference clock circuit 3A generates the reference clock Cs of the angular frequency ωs, on which the second radio signal S2 is based, and the reference clock Cs' of an angular frequency ωs', on which the second radio signal S2' is based.

Figure 14:
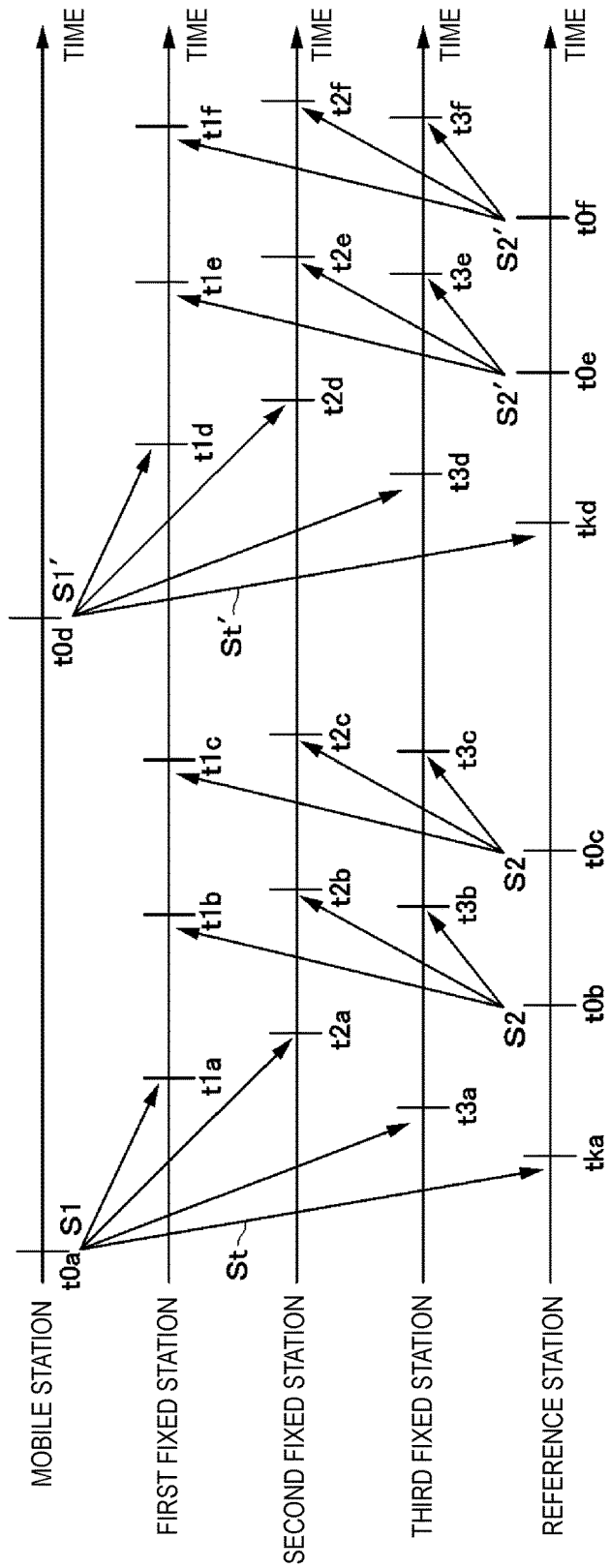
FIG. 14 is an explanatory drawing indicating the timing of transmission and reception of radio signals in the position detection system according to the third embodiment.

Next, a position detection method performed by the position detection system 31 according to the third embodiment will now be described with reference to FIG. 14 to FIG. 16.

Figure 16:
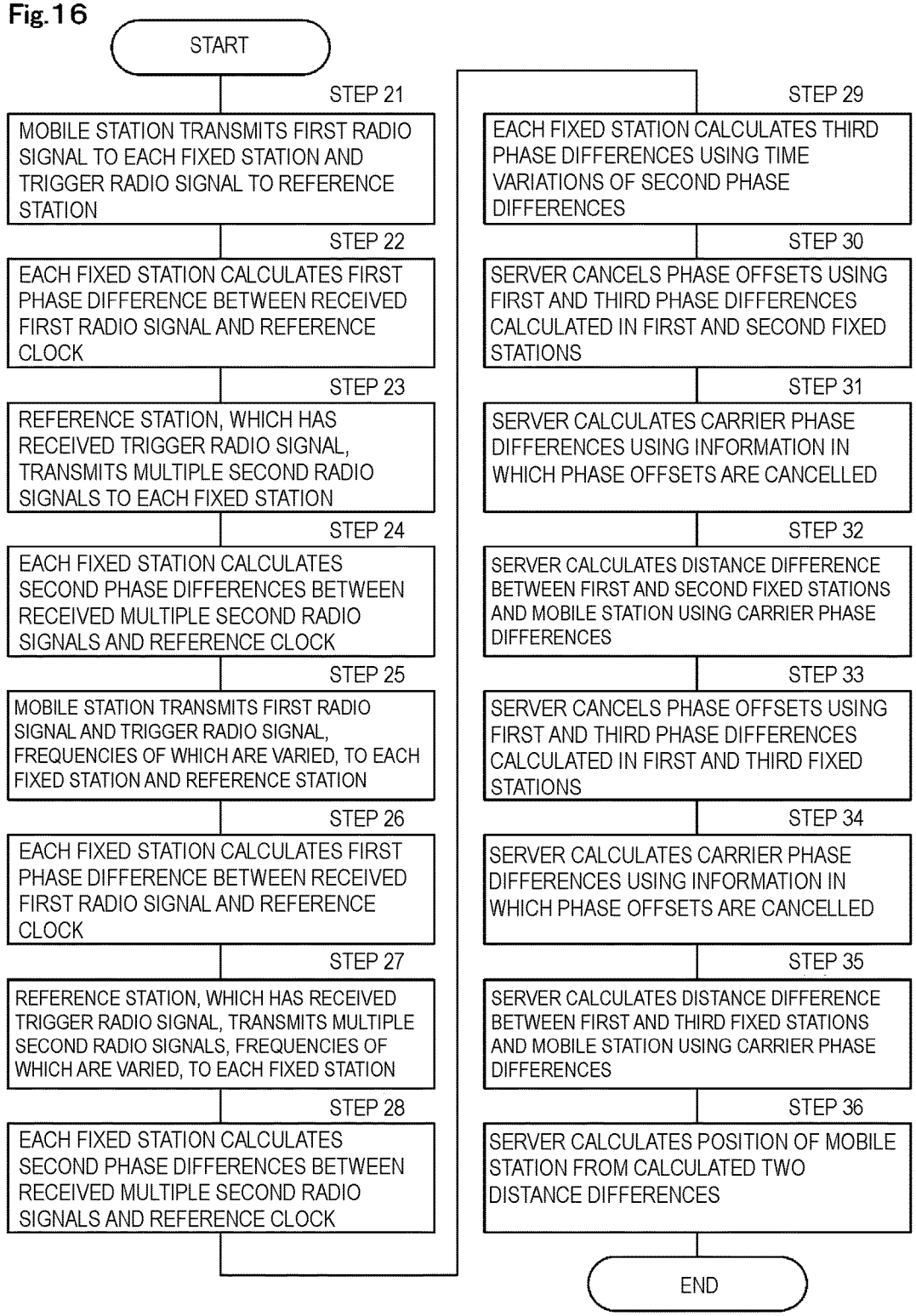
FIG. 16 is a flowchart illustrating the entire process performed by the position detection system according to the third embodiment.

Referring to FIG. 16, Step 21 indicates a specific example of the first radio signal transmission element. In Step 21, the mobile station 2 transmits the first radio signal S1 to each of the fixed stations 4 to 6 and transmits the trigger radio signal St used by the reference station 3 to transmit the second radio signal S2 (refer to FIG. 14).

Step 22 indicates a specific example of the first phase difference calculation element. In Step 22, the respective fixed stations 4 to 6 calculate the phase differences Δϕmf1 to Δϕmf3 between the carrier phase Pm of the received first radio signal S1 and the phases Pf1 to Pf3 of the reference clocks Cf1 to Cf3 (refer to Formula 6 to Formula 12).

Step 23 indicates a specific example of the second radio signal transmission element. In Step 23, the reference station 3, which has received the trigger radio signal St, transmits the multiple second radio signals S2 (for example, two times) to each of the fixed stations 4 to 6. In this case, the reference station 3, which has received the trigger radio signal St at the time tka, may transmit the second radio signal S2 after a predetermined time elapses (refer to Formula 13 and Formula 14).

Step 24 indicates a specific example of the second phase difference calculation element. In Step 24, the respective fixed stations 4 to 6 calculate the phase differences Δϕsbf1 to Δϕsbf3 and Δϕscf1 to Δϕscf3 between the carrier phases Ps1 and Ps2 of the received second radio signals S2 and the phases Pf1 to Pf3 of the reference clocks Cf1 to Cf3 (refer to Formula 15 to Formula 26).

Step 25 indicates a specific example of the first radio signal transmission element. In Step 25, the mobile station 2 transmits the first radio signal S1' of a carrier frequency different from that of the first radio signal S1 to each of the fixed stations 4 to 6. Specifically, the mobile station reference clock circuit 2A generates the reference clock Cm' of the angular frequency ωm', on which the first radio signal S1' is based, and transmits the first radio signal S1' via the transmission antenna 2D. Carrier phase Pm' of the first radio signal S1' which the mobile station 2 transmits at a time t0d is represented by Formula 42 described below.

$$Pm' = \omega m' \cdot t0d + \phi m$$ [Formula 42]

Step 26 indicates a specific example of the first phase difference calculation element. In Step 26, the respective fixed stations 4 to 6 calculate phase differences Δϕmf1' to Δϕmf3' between the carrier phase Pm' of the received first radio signal S1' and the phases Pf1 to Pf3 of the reference clocks Cf1 to Cf3. Specifically, the phase Pf1 of the reference clock Cf1 is represented by Formula 43 described below, and the phase difference Δϕmf1' between the carrier phase Pm' of the first radio signal S1' and the phase Pf1 of the reference clock Cf1 is represented by Formula 44 described below where the time when the first fixed station 4 receives the first radio signal S1' is denoted by t1d.

$$Pf1 = \omega f1 \cdot t1d + \phi f1$$ [Formula 43]

$$\Delta\phi mf1' = Pm' - Pf1 = \omega m' \cdot t0d - \omega f1 \cdot t1d + \phi m - \phi f1$$ [Formula 44]

Similarly, the phase Pf2 of the reference clock Cf2 is represented by Formula 45 described below, and the phase difference Δϕmf2' between the carrier phase Pm' of the first radio signal S1' and the phase Pf2 of the reference clock Cf2 is represented by Formula 46 described below where the time when the second fixed station 5 receives the first radio signal S1' is denoted by t2d.

$$Pf2 = \omega f2 \cdot t2d + \phi f2$$ [Formula 45]

$$\Delta\phi mf2' = Pm' - Pf2 = \omega m' \cdot t0d - \omega f2 \cdot t2d + \phi m - \phi f2$$ [Formula 46]

Similarly, the phase Pf3 of the reference clock Cf3 is represented by Formula 47 described below, and the phase difference Δϕmf3' between the carrier phase Pm' of the first radio signal S1' and the phase Pf3 of the reference clock Cf3 is represented by Formula 48 described below where the time when the third fixed station 6 receives the first radio signal S1' is denoted by t3d.

$$Pf3=\omega f3 \cdot t3d+\phi f3 \qquad \text{[Formula 47]}$$

$$\Delta\phi mf3'=Pm'-Pf3=\omega m' \cdot t0d-\omega f3 \cdot t3d+\phi m-\phi f3 \qquad \text{[Formula 48]}$$

Step 27 indicates a specific example of the second radio signal transmission element. In Step 27, the reference station 3, which has received a trigger radio signal St', transmits the multiple second radio signal S2' of a carrier frequency different from that of the second radio signal S2 (for example, two times) to each of the fixed stations 4 to 6. Specifically, the reference station reference clock circuit 3A generates the reference clock Cs' of the angular frequency ωs', on which the second radio signals S2' are based, and transmits the second radio signals S2' via the transmission-reception antenna 3F. In this case, the reference station 3, which has received the trigger radio signal St' at a time tkd, may transmit the second radio signals S2 after a predetermined time elapses. The time difference between a time t0e and a time t0f is set within a range, for example, in which the variations in second phase differences (the difference between a phase difference Δϕsef1 and a phase difference Δϕsff1, the difference between a phase difference Δϕsef2 and a phase difference Δϕsff2, and the difference between a phase difference Δϕsef3 and a phase difference Δϕsff3) are lower than or equal to 2π.

Carrier phase Ps1' of the first-time second radio signal S2' transmitted by the reference station 3 at the time t0e is represented by Formula 49 described below. Carrier phase Ps2' of the second-time second radio signal S2' transmitted by the reference station 3 at the time t0f is represented by Formula 50 described below.

$$Ps1'=\omega s' \cdot t0e+\phi s \qquad \text{[Formula 49]}$$

$$Ps2'=\omega s' \cdot t0f+\phi s \qquad \text{[Formula 50]}$$

Step 28 indicates a specific example of the second phase difference calculation element. In Step 28, the respective fixed stations 4 to 6 calculate the second phase differences Δϕsef1 to Δϕsef3 and Δϕsff1 to Δϕsff3 between the carrier phases Ps1' and Ps2' of the received second radio signals S2' and the phases Pf1 to Pf3 of the reference clocks Cf1 to Cf3. Specifically, the phase Pf1 of the reference clock Cf1 is represented by Formula 51 described below, and the second phase difference Δϕsef1 between the carrier phase Ps1' of the second radio signal S2' and the phase Pf1 of the reference clock Cf1 is represented by Formula 52 described below where the time when the first fixed station 4 receives the first-time second radio signal S2' is denoted by t1e.

$$Pf1=\omega f1 \cdot t1e+\phi f1 \qquad \text{[Formula 51]}$$

$$\Delta\phi sef1=Ps1'-Pf1=\omega s' \cdot t0e-\omega f1 \cdot t1e+\phi s-\phi f1 \qquad \text{[Formula 52]}$$

In addition, the phase Pf1 of the reference clock Cf1 is represented by Formula 53 described below, and the second phase difference Δϕsff1 between the carrier phase Ps2' of the second radio signal S2' and the phase Pf1 of the reference clock Cf1 is represented by Formula 54 described below where the time when the first fixed station 4 receives the second-time second radio signal S2' is denoted by t1f.

$$Pf1=\omega f1 \cdot t1f+\phi f1 \qquad \text{[Formula 53]}$$

$$\Delta\phi sff1=Ps2'-Pf1=\omega s' \cdot t0f-\omega f1 \cdot t1f+\phi s-\phi f1 \qquad \text{[Formula 54]}$$

Similarly, the phase Pf2 of the reference clock Cf2 is represented by Formula 55 described below, and the second phase difference Δϕsef2 between the carrier phase Ps1' of the second radio signal S2' and the phase Pf2 of the reference clock Cf2 is represented by Formula 56 described below where the time when the second fixed station 5 receives the first-time second radio signal S2' is denoted by t2e.

$$Pf2=\omega f2 \cdot t2e+\phi f2 \qquad \text{[Formula 55]}$$

$$\Delta\phi sef2=Ps1'-Pf2=\omega s' \cdot t0e-\omega f2 \cdot t2e+\phi s-\phi f2 \qquad \text{[Formula 56]}$$

In addition, the phase Pf2 of the reference clock Cf2 is represented by Formula 57 described below, and the second phase difference Δϕsff2 between the carrier phase Ps2' of the second radio signal S2' and the phase Pf2 of the reference clock Cf2 is represented by Formula 58 described below where the time when the second fixed station 5 receives the second-time second radio signal S2' is denoted by t2f.

$$Pf2=\omega f2 \cdot t2f+\phi f2 \qquad \text{[Formula 57]}$$

$$\Delta\phi sff2=Ps2'-Pf2=\omega s' \cdot t0f-\omega f2 \cdot t2f+\phi s-\phi f2 \qquad \text{[Formula 58]}$$

Similarly, the phase Pf3 of the reference clock Cf3 is represented by Formula 59 described below, and the second phase difference Δϕsef3 between the carrier phase Ps1' of the second radio signal S2' and the phase Pf3 of the reference clock Cf3 is represented by Formula 60 described below where the time when the third fixed station 6 receives the first-time second radio signal S2' is denoted by t3e.

$$Pf3=\omega f3 \cdot t3e+\phi f3 \qquad \text{[Formula 59]}$$

$$\Delta\phi sef3=Ps1'-Pf3=\omega s' \cdot t0e-\omega f3 \cdot t3e+\phi s-\phi f3 \qquad \text{[Formula 60]}$$

In addition, the phase Pf3 of the reference clock Cf3 is represented by Formula 61 described below, and the second phase difference Δϕsff3 between the carrier phase Ps2' of the second radio signal S2' and the phase Pf3 of the reference clock Cf3 is represented by Formula 62 described below where the time when the third fixed station 6 receives the second-time second radio signal S2' is denoted by t3f.

$$Pf3=\omega f3 \cdot t3f+\phi f3 \qquad \text{[Formula 61]}$$

$$\Delta\phi sff3=Ps2'-Pf3=\omega s' \cdot t0f-\omega f3 \cdot t3f+\phi s-\phi f3 \qquad \text{[Formula 62]}$$

Step 29 indicates a specific example of the third phase difference calculation element. In Step 29, the first to third fixed stations 4 to 6 calculate time variations Δϕ1/Δt, Δϕ1'/Δt, Δϕ2/Δt, Δϕ2'/Δt, Δϕ3/Δt, and Δϕ3'/Δt of the second phase differences Δϕsbf1 to Δϕsbf3, Δϕscf1 to Δϕscf3, Δϕsef1 to Δϕsef3, and Δϕsff1 to Δϕsff3 based on the multiple second phase differences Δϕsbf1 to Δϕsbf3, Δϕscf1 to Δϕscf3, Δϕsef1 to Δϕsef3, and Δϕsff1 to Δϕsff3 calculated by the first to third fixed stations 4 to 6. In this case, the first to third fixed stations 4 to 6 calculate the third phase differences Δϕsaf1 to Δϕsaf3 between the carrier phase Ps of the second radio signal S2 and the phases Pf1 to Pf3 of the reference clocks Cf1 to Cf3 at the timing when the first radio signal S1 is received based on the time variations Δϕ1/Δt, Δϕ2/Δt, and Δϕ3/Δt of the second phase differences Δϕsbf1 and Δϕsbf3 and Δϕscf1 to Δϕscf3 (refer to Formula 30 to Formula 32).

In addition, the first to third fixed stations 4 to 6 calculate third phase differences Δϕsdf1 to Δϕsdf3 between the carrier phase Ps' of the second radio signal S2' and the phases Pf1 to Pf3 of the reference clocks Cf1 to Cf3 at the timing when the first radio signal S1' is received based on the time variations Δϕ1'/Δt, Δϕ2'/Δt, and Δϕ3'/Δt of the second phase differences Δϕsef1 and Δϕsef3 and Δϕsff1 to Δϕsff3.

In this case, the first fixed station 4 calculates the third phase difference Δϕsdf1 at the time t1d when the first fixed station 4 has received the first radio signal S1' using the extrapolation based on information about the second phase differences $\Delta\phi sef1$ and $\Delta\phi sff1$ calculated at the times t1e and t1f (refer to Formula 66). Similarly, the second fixed station 5 calculates the third phase difference $\Delta\phi sdf2$ at the time t2d when the second fixed station 5 has received the first radio signal S1' based on information about the second phase differences $\Delta\phi sef2$ and $\Delta\phi sff2$ calculated at the times t2e and t2f (refer to Formula 67). Similarly, the third fixed station 6 calculates the third phase difference $\Delta\phi sdf3$ at the time t3d when the third fixed station 6 has received the first radio signal S1' based on information about the second phase differences $\Delta\phi sef3$ and $\Delta\phi sff3$ calculated at the times t3e and t3f (refer to Formula 68). In this case, the relationship between the time toe and the time t0f, between the time t1e and time t1f, between the time t2e and the time t2f, and between the time t3e and the time t3f is represented by Formula 63 described below, and Formula 64 and Formula 65 are derived from Formula 63.

$$t0e - t0f = t1e - t1f = t2e - t2f = t3e - t3f \quad \text{[Formula 63]}$$

$$t2e - t1e = t2f - t1f \quad \text{[Formula 64]}$$

$$t3e - t1e = t3f - t1f \quad \text{[Formula 65]}$$

$$\begin{aligned}
\Delta\phi sdf1 &= t1d \cdot \frac{\Delta\phi 1'}{\Delta t} + \frac{\Delta\phi sef1 \cdot t1f - \Delta\phi sff1 \cdot t1e}{t1f - t1e} \\
&= t1d \cdot \frac{\Delta\phi sff1 - \Delta\phi sef1}{t1f - t1e} + \frac{\Delta\phi sef1 \cdot t1f - \Delta\phi sff1 \cdot t1e}{t1f - t1e} \\
&= t1d(\omega s' - \omega f1) + \phi s - \phi f1 + \frac{\omega s'(t0e \cdot t1f - t0f \cdot t1e)}{t1f - t1e}
\end{aligned} \quad \text{[Formula 66]}$$

$$\begin{aligned}
\Delta\phi sdf2 &= t2d \cdot \frac{\Delta\phi 2'}{\Delta t} + \frac{\Delta\phi sef2 \cdot t2f - \Delta\phi sff2 \cdot t2e}{t2f - t2e} \\
&= t2d \cdot \frac{\Delta\phi sff2 - \Delta\phi sef2}{t2f - t2e} + \frac{\Delta\phi sef2 \cdot t2f - \Delta\phi sff2 \cdot t2e}{t2f - t2e} \\
&= t2d(\omega s' - \omega f2) + \phi s - \phi f2 + \frac{\omega s'(t0e \cdot t2f - t0f \cdot t2e)}{t2f - t2e}
\end{aligned} \quad \text{[Formula 67]}$$

$$\begin{aligned}
\Delta\phi sdf3 &= t3d \cdot \frac{\Delta\phi 3'}{\Delta t} + \frac{\Delta sef3 \cdot t3f - \Delta sff3 \cdot t3e}{t3f - t3e} \\
&= t3d \cdot \frac{\Delta\phi sff3 - \Delta\phi sef3}{t3f - t3e} + \frac{\Delta\phi sef3 \cdot t3f - \Delta\phi sff3 \cdot t3e}{t3f - t3e} \\
&= t3d(\omega s' - \omega f3) + \phi s - \phi f3 + \frac{\omega s'(t0e \cdot t3f - t0f \cdot t3e)}{t3f - t3e}
\end{aligned} \quad \text{[Formula 68]}$$

Step 30 indicates a specific example of the phase offset cancel element. In Step 30, the server 7 cancels the phase offsets $\phi m$, $\phi s$, $\phi f1$, and $\phi f2$ of the reference clocks Cm, Cs, Cf1, and Cf2 at the mobile station 2, the reference station 3, and the first and second fixed stations 4 and 5 using the first phase differences $\Delta\phi mf1$, $\Delta\phi mf1'$, $\Delta\phi mf2$, and $\Delta\phi mf2'$ and the third phase differences $\Delta\phi saf1$, $\Delta\phi saf2$, $\Delta\phi sdf1$, and $\Delta\phi sdf2$, which are calculated by the first and second fixed stations 4 and 5. In other words, the phase difference $\Delta\phi 21$ is calculated using Formula 33 described above and a phase difference $\Delta\phi 21'$ is calculated using Formula 69 described below.

$$\Delta\phi 21' = (\Delta\phi sdf2 - \Delta\phi mf2') - (\Delta\phi sdf1 - \Delta\phi mf1') = \omega s'(t2d - t1d - t2e + t1e) \quad \text{[Formula 69]}$$

Step 31 indicates a specific example of the carrier phase difference calculation element. In Step 31, the server 7 calculates the carrier phase difference $\Delta 21$ and a carrier phase difference $\Delta 21'$ between the first fixed station 4 and the second fixed station 5 using the phase differences $\Delta\phi 21$ and $\Delta\phi 21'$, which is information resulting from cancellation of the phase offsets $\phi m$, $\phi s$, $\phi f1$, and $\phi f2$. In other words, the carrier phase difference $\Delta 21$ is calculated according to Formula 34 described above and the carrier phase difference $\Delta 21'$ using the first radio signal S1' is calculated according to Formula 70 described below.

$$\Delta 21' = \omega s'(t2d - t1d) = \Delta\phi 21' + \omega s'(t1e - t2e) \quad \text{[Formula 70]}$$

Step 32 indicates a specific example of the distance difference calculation element. In Step 32, the server 7 calculates the distance difference $\Delta r12$ between the distance between the first fixed station 4 and the mobile station 2 and the distance between the second fixed station 5 and the mobile station 2 using the carrier phase differences $\Delta 21$ and $\Delta 21'$. As illustrated in FIG. 15, the distance difference $\Delta r12$, which is an integral multiple of a wavelength $\lambda_1$, is calculated each time the carrier phase difference $\Delta 21$ reaches $2\pi$ where $\lambda_1$ denotes the wavelength of the first radio signal S1.

In addition, the distance difference $\Delta r12$, which is an integral multiple of a wavelength $\lambda_2$, is calculated each time the carrier phase difference $\Delta 21'$ reaches $2\pi$ where $\lambda_2$ denotes the wavelength of the first radio signal S1'.

Figure 15:
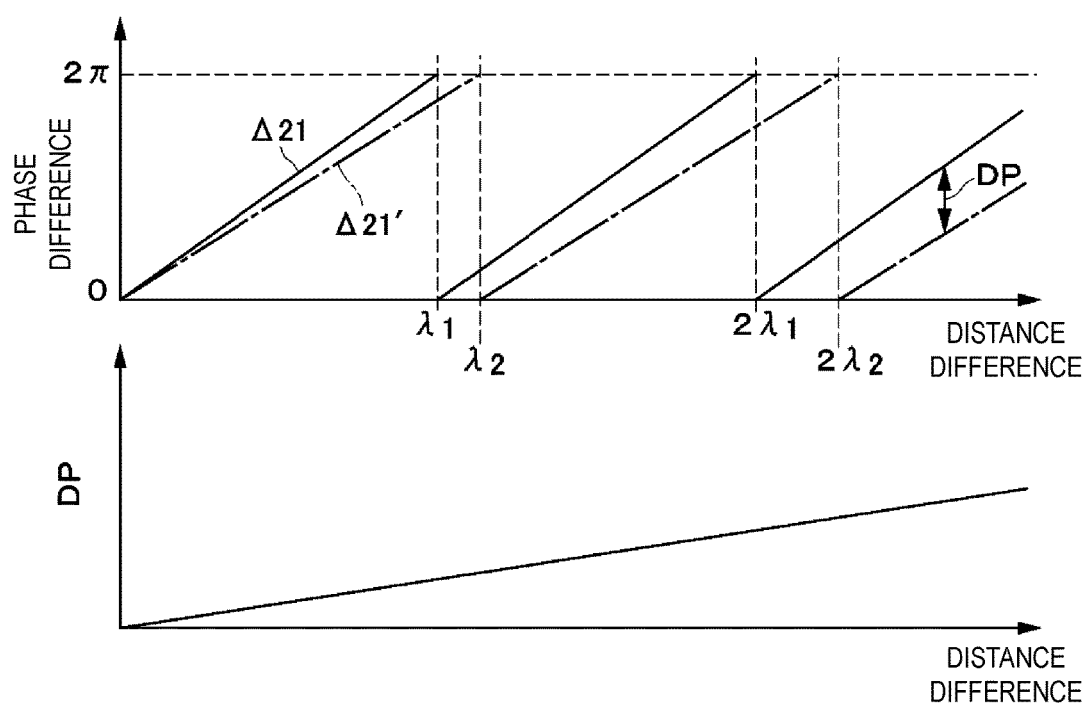
FIG. 15 is an explanatory drawing indicating the relationship among carrier phase differences of first radio signals, the difference between the carrier phase differences, and a distance difference according to the third embodiment.

In this case, since the carrier phase difference $\Delta 21$ is different from the carrier phase difference $\Delta 21'$ in the angular frequencies $\omega m$ and $\omega m'$ of the reference clocks Cm and Cm', which are repetition cycles of the carrier phase differences $\Delta 21$ and $\Delta 21'$, use of the difference DP ($=\Delta 21 - \Delta 21'$) between the phase differences enables the number of cycles of the carrier phase difference $\Delta 21$ and the carrier phase difference $\Delta 21'$ to be calculated (refer to FIG. 15). Specifically, for example, when the angular frequency $\omega m$ is 2.44 GHz and the angular frequency $\omega m'$ is 2.45 GHz, the wavelengths $\lambda_1$ and $\lambda_2$ are 12.29 cm and 12.36 cm, respectively. The difference DP between the carrier phase differences $\Delta 21$ and $\Delta 21'$ is repeated every 30 m and the carrier phase differences $\Delta 21$ and $\Delta 21'$ are capable of being uniquely calculated if the available range of the position detection system 31 is within 30 m.

Step 33 indicates a specific example of the phase offset cancel element. In Step 33, the server 7 cancels the phase offsets $\phi m$, $\phi s$, $\phi f1$, and $\phi f3$ of the reference clocks Cm, Cs, Cf1, and Cf3 at the mobile station 2, the reference station 3, and the first and third fixed stations 4 and 6 using the first phase differences $\Delta\phi mf1$, $\Delta\phi mf1'$, $\Delta\phi mf3$, and $\Delta\phi mf3'$ and the third phase differences $\Delta\phi saf1$, $\Delta\phi saf3$, $\Delta\phi sdf1$, and $\Delta\phi sdf3$, which are calculated by the first and third fixed stations 4 and 6. Specifically, the phase difference $\Delta\phi 31$ is calculated using Formula 35 described above and a phase difference $\Delta\phi 31'$ is calculated using Formula 71 described below.

$$\Delta\phi 31' = (\Delta\phi sdf3 - \Delta\phi mf3') - (\Delta\phi sdf1 - \Delta\phi mf1') = \omega s'(t3d - t1d - t3e + t1e) \quad \text{[Formula 71]}$$

Step 34 indicates a specific example of the carrier phase difference calculation element. In Step 34, the server 7 calculates the carrier phase difference $\Delta 31$ and a carrier phase difference $\Delta 31'$ between the first fixed station 4 and the third fixed station 6 using the phase differences $\Delta\phi 31$ and $\Delta\phi 31'$, which is information resulting from cancellation of the phase offsets $\phi m$, $\phi s$, $\phi f1$, and $\phi f3$. Specifically, the carrier phase difference $\Delta 31$ is calculated according to Formula 36 described above and the carrier phase difference $\Delta 31'$ using the first radio signal S1' is calculated according to Formula 72 described below.

$$\Delta 31' = \omega s'(t3d - t1d) = \Delta\phi 31' + \omega s'(t1e - t3e) \quad \text{[Formula 72]}$$

Step 35 indicates a specific example of the distance difference calculation element. In Step 35, the server 7 calculates the distance difference $\Delta r13$ between the distance between the first fixed station 4 and the mobile station 2 and the distance between the third fixed station 6 and the mobile station 2 using the carrier phase differences $\Delta 31$ and $\Delta 31'$. In the other words, as in the calculation of the distance difference $\Delta r12$, calculating the difference between the carrier phase difference $\Delta 31$ and the carrier phase difference $\Delta 31'$ enables the carrier phase differences $\Delta 31$ and $\Delta 31'$ to be uniquely calculated.

Step 36 indicates a specific example of the mobile station position calculation element. In Step 36, the server 7 calculates the position of the mobile station 2 from the calculated two distance differences $\Delta r12$ and $\Delta r13$. Specifically, the server 7 is capable of calculating the position of the mobile station 2 from the intersection between the hyperbolic curve of the distance difference $\Delta r12$ and the hyperbolic curve of the distance difference $\Delta r13$.

As described above, substantially the same effects and advantages as those in the first embodiment are achieved also in the third embodiment. In the third embodiment, in the mobile station 2, the mobile station reference clock circuit 2A has the function to generate the reference clocks Cm and Cm' of the two frequencies and is configured so as to transmit the first radio signals S1 and S1' of the angular frequencies $\omega m$ and $\omega m'$ of the two kinds. In the reference station 3, the reference station reference clock circuit 3A has the function to generate the reference clocks Cs and Cs' of the two frequencies and is configured so as to transmit the second radio signals S2 and S2' of the angular frequencies $\omega s$ and $\omega s'$ of the two kinds.

In this case, the carrier phase difference $\Delta 21$ ($\Delta 31$) detected using the angular frequencies $\omega m$ and $\omega s$ of one kind is different from the carrier phase difference $\Delta 21'$ ($\Delta 31'$) detected using the angular frequencies $\omega m'$ and $\omega s'$ of the other kind in their repetition cycles. Accordingly, the number of cycles of the two carrier phase differences $\Delta 21$ and $\Delta 21'$ ($\Delta 31$ and $\Delta 31'$) is capable of being calculated using the difference DP between the two carrier phase differences $\Delta 21$ and $\Delta 21'$ ($\Delta 31$ and $\Delta 31'$). Consequently, the cycle of the phase difference is lengthened and the uncertainty of the phase cycle is removed to calculate the absolute phase, thus calculating the position of the mobile station 2 with high accuracy.

In addition, performing the phase correction using the first radio signals S1 and S1' of the angular frequencies $\omega m$ and $\omega m'$ of the two kinds, transmitted by the mobile station 2, and the first radio signals S2 and S2' of the angular frequencies $\omega s$ and $\omega s'$ of the two kinds, transmitted by the reference station 3, enables the accuracy of the phase correction to be increased. As a result, it is possible to calculate the position of the mobile station 2 with high accuracy.

The position detection system 1 has the configuration including the three fixed stations 4 to 6 in the first embodiment. However, the present disclosure is not limited to this configuration and the position detection system may have a configuration including four or more fixed stations. The same applies to the second and third embodiments.

Each fixed station reference clock circuit, the mobile station reference clock circuit, and the reference station reference clock circuit may be configured so as to use the reference clocks of the same angular frequency in the first embodiment. The same applies to the second and third embodiments.

The position detection system 1 has the configuration including one mobile station 2 in the first embodiment. However, the present disclosure is not limited this configuration and the position detection system may have a configuration including two or more mobile stations. In this case, for example, a configuration may be adopted in which identification (ID) information is added to the first radio signals transmitted from the mobile stations and each mobile station is identified using the ID information. The same applies to the second and third embodiments.

The server 7 is configured so as to calculate the position of the mobile station 2 from the intersection between the hyperbolic curve of the distance difference $\Delta r12$ between the first fixed station 4 and the second fixed station 5 and the hyperbolic curve of the distance difference $\Delta r13$ between the first fixed station 4 and the third fixed station 6 in the first embodiment. However, the present disclosure is not limited to this configuration and the server may be configured so as to further calculate a hyperbolic curve of a distance difference $\Delta r23$ ($=r2-r3$) between the second fixed station and the third fixed station to calculate the position of the mobile station from the three hyperbolic curves of the distance differences $\Delta r12$, $\Delta r13$, and $\Delta r23$. The same applies to the second and third embodiments.

The first fixed station 22 is configured so as to also function as the reference station and transmit the second radio signal S2 to each of the fixed stations 5 and 6 in the second embodiment. However, the present disclosure is not limited to this configuration and the second fixed station or the third fixed station may be configured so as to also function as the reference station and transmit the second radio signal. In addition, among the fixed stations, two or more fixed stations may be configured so as to also function as the reference station and transmit the second radio signal.

The mobile station reference clock circuit 2A is configured so as to have the function to generate the reference clocks Cm and Cm' of the two angular frequencies $\omega m$ and $\omega m'$, and the mobile station is configured so as to transmit the first radio signals S1 and S1' of the two kinds in the third embodiment. However, the present disclosure is not limited to this configuration. The mobile station reference clock circuit may be configured so as to generate the reference clocks of three or more angular frequencies, and the mobile station may be configured so as to transmit first radio signals of three or more kinds.

The reference station reference clock circuit 3A is configured so as to have the function to generate the reference clocks Cs and Cs' of the two angular frequencies ωs and ωs', and the reference station is configured so as to transmit the second radio signals S2 and S2' of the two kinds in the third embodiment. However, the present disclosure is not limited to this configuration. The reference station reference clock circuit may be configured so as to generate the reference clocks of three or more angular frequencies and the reference station may be configured so as to transmit second radio signals of three or more kinds.

1, 21, 31 position detection system
2 mobile station
2A mobile station reference clock circuit
2C, 3C, 22C radio signal transmission circuit
2D transmission antenna
3 reference station
3A reference station reference clock circuit
3D, 4C, 5C, 6C, 22D radio signal reception circuit
3F, 22F transmission-reception antenna
4, 22 first fixed station
4A, 5A, 6A, 22A fixed station reference clock circuit
4D, 5D, 6D reception antenna
5 second fixed station
6 third fixed station

The invention claimed is:

1. A position detection system comprising:
a mobile station comprising a mobile station reference clock circuit, a radio signal transmission circuit, and a transmission antenna;
a reference station comprising a reference station reference clock circuit, a radio signal reception circuit, a reception antenna, a radio signal transmission circuit, and a transmission antenna;
at least three fixed stations, each of the at least three fixed stations including a fixed station reference clock circuit, a radio signal reception circuit, and a reception antenna; and
a server, wherein:
the fixed station reference clock circuits in each of the fixed stations are configured to operate asynchronously and independently,
the mobile station is configured to intermittently transmit a first radio signal and a trigger radio signal based on a reference clock of the mobile station reference clock circuit,
the reference station is disposed at a predetermined position and, upon reception of the trigger radio signal transmitted from the mobile station, is configured to transmit a second radio signal a plurality of times based on a reference clock of the reference station reference clock circuit,
each fixed station is configured to:
receive the first radio signal and extract a first phase difference between a carrier included in the first radio signal and a reference clock of each fixed station,
receive the plurality of second radio signals and extract a plurality of second phase differences between carriers included in the second radio signals and the reference clock of each fixed station,
calculate a time variation of the second phase differences based on the extracted plurality of second phase differences, and
calculate a third phase difference between the carrier included in the second radio signal and the reference clock of each fixed station when the first radio signal is received, the third phase difference being calculated based on the calculated time variation, and
the server is configured to:
cancel phase offsets of the reference clock of each fixed station based on phase difference information between the mobile station and each fixed station, and based on phase difference information between the reference station and each fixed station, and
calculate a position of the mobile station based on distance information between each fixed station and the mobile station.

2. The position detection system according to claim 1, wherein the fixed station reference clock circuits in each of the fixed stations generate reference clocks having the same frequency.

3. The position detection system according to claim 1, wherein at least one of the fixed stations also serves as the reference station and transmits the plurality of second radio signals.

4. The position detection system according to claim 1, wherein:
the mobile station reference clock circuit in the mobile station is configured to generate at least two reference clocks having different frequencies,
the mobile station is configured to transmit first radio signals with at least two carrier frequencies,
the reference station reference clock circuit in the reference station is configured to generate at least two reference clocks having different frequencies, and
the plurality of second radio signals are transmitted with at least two carrier frequencies.

5. A position detection method comprising:
asynchronously and independently generating reference clocks in at least three fixed stations;
intermittently transmitting, from a mobile station, a first radio signal and a trigger radio signal based on a reference clock of the mobile station;
upon reception of the trigger radio signal at a reference station, transmitting a second radio signal a plurality of times based on a reference clock of the reference station;
receiving, at each fixed station, the first radio signal and extracting a first phase difference between a carrier included in the first radio signal and the reference clock of each fixed station;
receiving, at each fixed station, the plurality of second radio signals are received, and extracting a plurality of second phase differences between carriers included in the second radio signals and the reference clock of each fixed station;
calculating a time variation of the second phase differences based on the extracted plurality of second phase differences;
calculating a third phase difference between the carrier included in the second radio signals and the reference clock of each fixed station when the first radio signal is received, the third phase difference being calculated based on the calculated time variation;
cancelling a phase offset of the reference clock of each fixed station based on phase difference information between the mobile station and each fixed station, and based on phase difference information between the reference station and each fixed station; and calculating a position of the mobile station based on distance information between each fixed station and the mobile station is acquired to calculate a position of the mobile station.

6. The position detection method according to claim 5, wherein the reference clocks of each fixed station have the same frequency.

7. The position detection method according to claim 5, wherein at least one of the fixed stations serves as the reference station and transmits the plurality of second radio signals.

8. The position detection method according to claim 5, wherein:

the mobile station generates at least two reference clocks having different frequencies, the mobile station transmits first radio signals with at least two carrier frequencies, the reference station generates at least two reference clocks having different frequencies, and the reference station transmits the plurality of second radio signals with at least two carrier frequencies.

* * * * *

UNITED STATES PATENT AND TRADEMARK OFFICE
CERTIFICATE OF CORRECTION

PATENT NO. : 10,495,724 B2
APPLICATION NO. : 16/186661
DATED : December 3, 2019
INVENTOR(S) : Koichi Takizawa It is certified that error appears in the above-identified patent and that said Letters Patent is hereby corrected as shown below:

In the Specification

Column 11, Line 61, "$Pf1=\omega f1 \cdot t1b+\omega f1$" should read -- $Pf1 = \omega f1 \cdot t1b + \phi f1$ --

Column 12, Line 4, "$Pf1=\omega f1 \cdot t1c+\omega f1$" should read -- $Pf1 = \omega f1 \cdot t1c + \phi f1$ --

Column 14, Line 1, "difference $\Delta 21$," should read -- difference $\Delta \phi 21$, --

Signed and Sealed this
Twentieth Day of October, 2020

Andrei Iancu
*Director of the United States Patent and Trademark Office*